United States Patent
Tajima et al.

(10) Patent No.: US 10,659,184 B2
(45) Date of Patent: May 19, 2020

(54) OPTICAL TRANSMISSION DEVICE, OPTICAL TRANSMISSION METHOD AND OPTICAL TRANSMISSION SYSTEM

(71) Applicant: FUJITSU LIMITED, Kawasaki-shi, Kanagawa (JP)

(72) Inventors: Kazuyuki Tajima, Yokosuka (JP); Yutaka Takita, Kawasaki (JP); Masatake Miyabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/225,593

(22) Filed: Dec. 19, 2018

(65) Prior Publication Data
US 2019/0238250 A1    Aug. 1, 2019

(30) Foreign Application Priority Data

Jan. 31, 2018  (JP) ................................. 2018-014840
Jul. 12, 2018  (JP) ................................. 2018-132020

(51) Int. Cl.
*H04J 14/02*     (2006.01)
*H04B 10/61*     (2013.01)
*H04B 10/572*    (2013.01)

(52) U.S. Cl.
CPC ............ *H04J 14/02* (2013.01); *H04B 10/572* (2013.01); *H04B 10/61* (2013.01); *H04J 14/0241* (2013.01); *H04J 14/0257* (2013.01)

(58) Field of Classification Search
None
See application file for complete search history.

(56) References Cited

U.S. PATENT DOCUMENTS 5,212,577 A * 5/1993 Nakamura ............. H04B 10/50
                                                                398/42
7,738,790 B2 * 6/2010 Nozue ................. H04J 14/0282
                                                                398/69

(Continued)

FOREIGN PATENT DOCUMENTS

JP     2007-124568     5/2007
JP     2008-054093     3/2008

(Continued)

OTHER PUBLICATIONS

Held, Gilbert, The Flavors of Ethernet, 2008, Taylor and Francis Group, LLC, pp. 45-98 (Year: 2008).*

*Primary Examiner* — Jai M Lee
(74) *Attorney, Agent, or Firm* — Fujitsu Patent Center

(57) ABSTRACT

An optical transmission device that is provided at a first site includes: an optical transmitter that transmits a first optical signal that includes first ID information to a second site using a first wavelength; and an optical receiver that receives a second optical signal that includes second ID information and that is transmitted using the first wavelength from the second site. When the first ID information matches the second ID information, the optical transmitter transmits a wavelength report that indicates a second wavelength to the second site using the first wavelength. When the optical receiver receives a completion report that indicates the wavelength report has been received at the second site, the optical transmitter transmits an optical signal to the second site using the second wavelength, and the optical receiver ceases to receive an optical signal of the first wavelength from the second site.

17 Claims, 29 Drawing Sheets

(56) References Cited

U.S. PATENT DOCUMENTS

| | | | |
|---|---|---|---|
| 7,873,277 B2* | 1/2011 | Kazawa | H04J 14/025 398/68 |
| 8,331,783 B2* | 12/2012 | Ikai | H04J 14/02 398/69 |
| 9,325,446 B2* | 4/2016 | Sambo | H04J 14/0201 |
| 10,014,974 B2* | 7/2018 | Wu | H04J 14/0223 |
| 2001/0026384 A1* | 10/2001 | Sakano | H04B 10/032 398/79 |
| 2007/0092256 A1* | 4/2007 | Nozue | H04J 14/0258 398/72 |
| 2007/0121577 A1 | 5/2007 | Tanaka et al. | |
| 2008/0050115 A1 | 2/2008 | Ikai et al. | |
| 2010/0142961 A1* | 6/2010 | Wisseman | H04J 14/0212 398/83 |
| 2010/0247095 A1* | 9/2010 | Fujita | H04J 3/14 398/29 |
| 2011/0135301 A1* | 6/2011 | Myslinski | H04B 10/572 398/34 |
| 2011/0200324 A1* | 8/2011 | Boertjes | H04J 14/0212 398/16 |
| 2012/0033974 A1 | 2/2012 | Ikai et al. | |
| 2012/0076506 A1* | 3/2012 | Goebuchi | H04B 10/615 398/202 |
| 2014/0376562 A1* | 12/2014 | Zhang | H04L 45/026 370/401 |
| 2015/0023664 A1* | 1/2015 | Mukai | H04J 14/0242 398/58 |
| 2015/0208146 A1* | 7/2015 | Younce | H04Q 11/0066 398/21 |
| 2015/0341137 A1* | 11/2015 | Kaneko | H04B 10/272 398/67 |
| 2016/0204875 A1* | 7/2016 | Araki | H04B 10/572 398/34 |
| 2016/0204876 A1* | 7/2016 | Kamura | H04J 14/0227 398/34 |
| 2016/0248539 A1* | 8/2016 | Kaneko | H04J 14/0282 |
| 2017/0064418 A1* | 3/2017 | Tao | H04B 10/27 |
| 2017/0180073 A1 | 6/2017 | Takeshita et al. | |
| 2017/0317777 A1* | 11/2017 | Jain | H04J 14/021 |

FOREIGN PATENT DOCUMENTS

| | | |
|---|---|---|
| JP | 2010-041444 | 2/2010 |
| JP | 2012-209818 | 10/2012 |
| WO | 2015/162874 | 10/2015 |

* cited by examiner

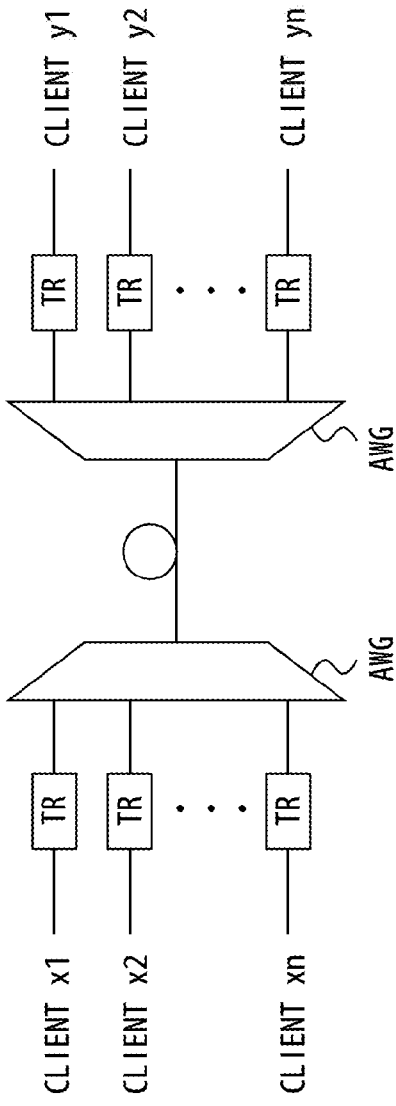 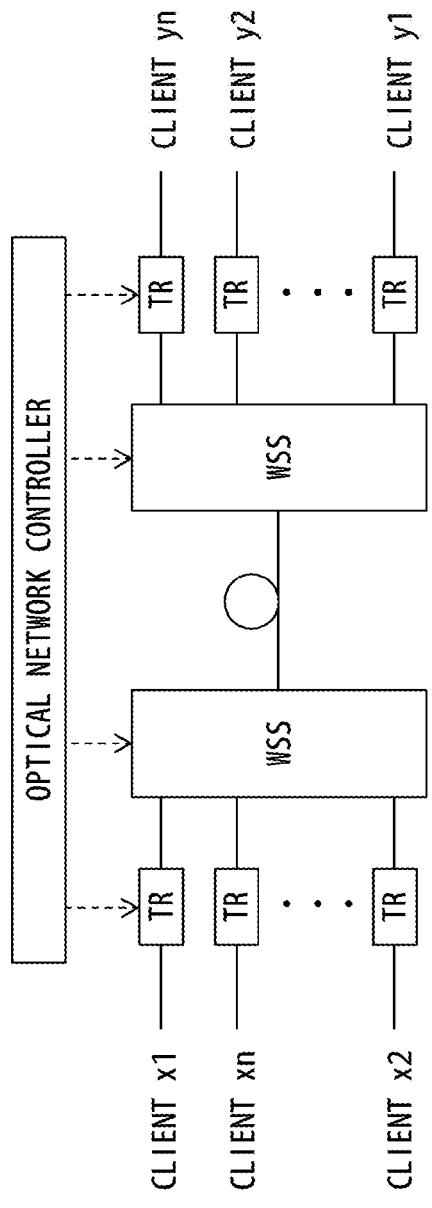
FIG. 1A
FIG. 1B
Related Art

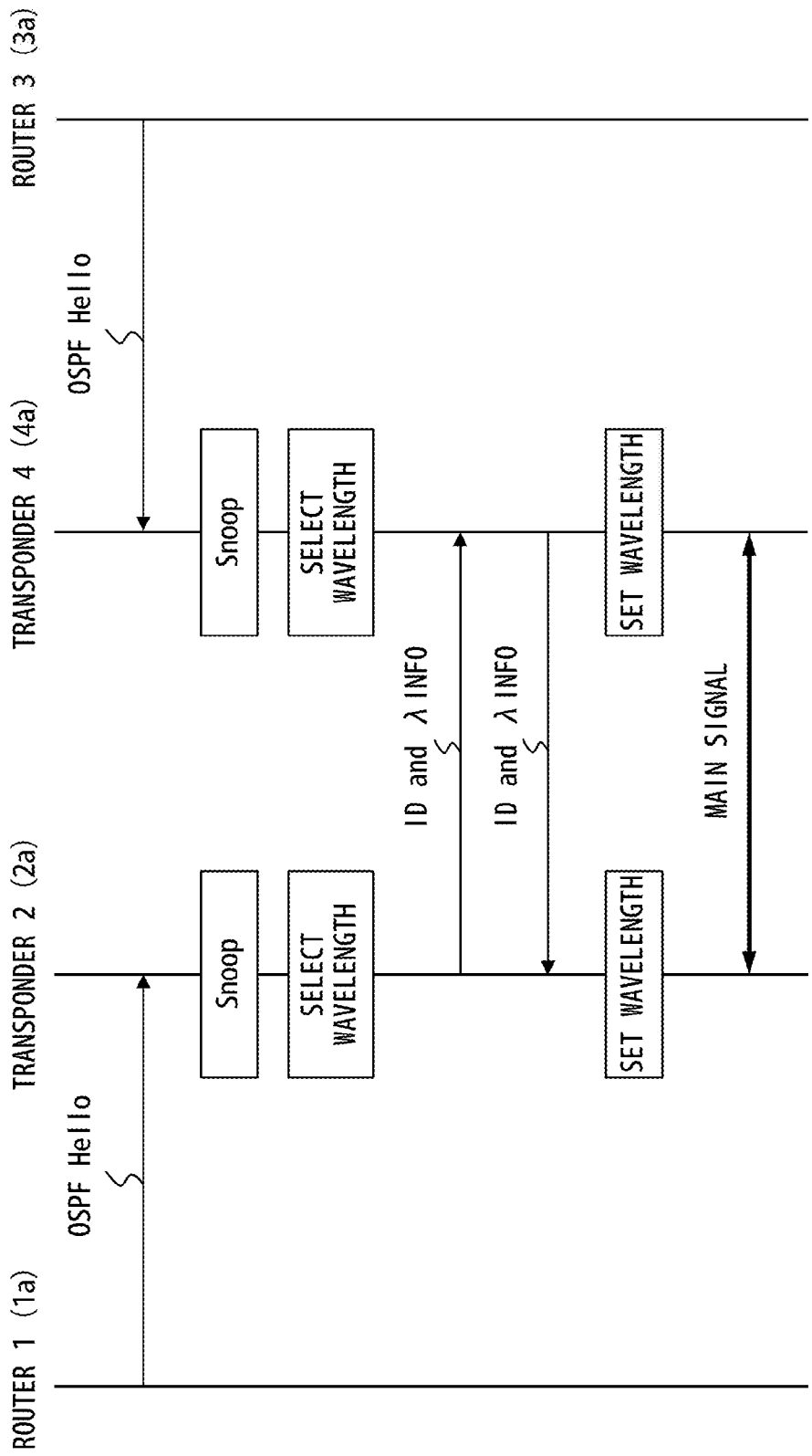
F I G. 4

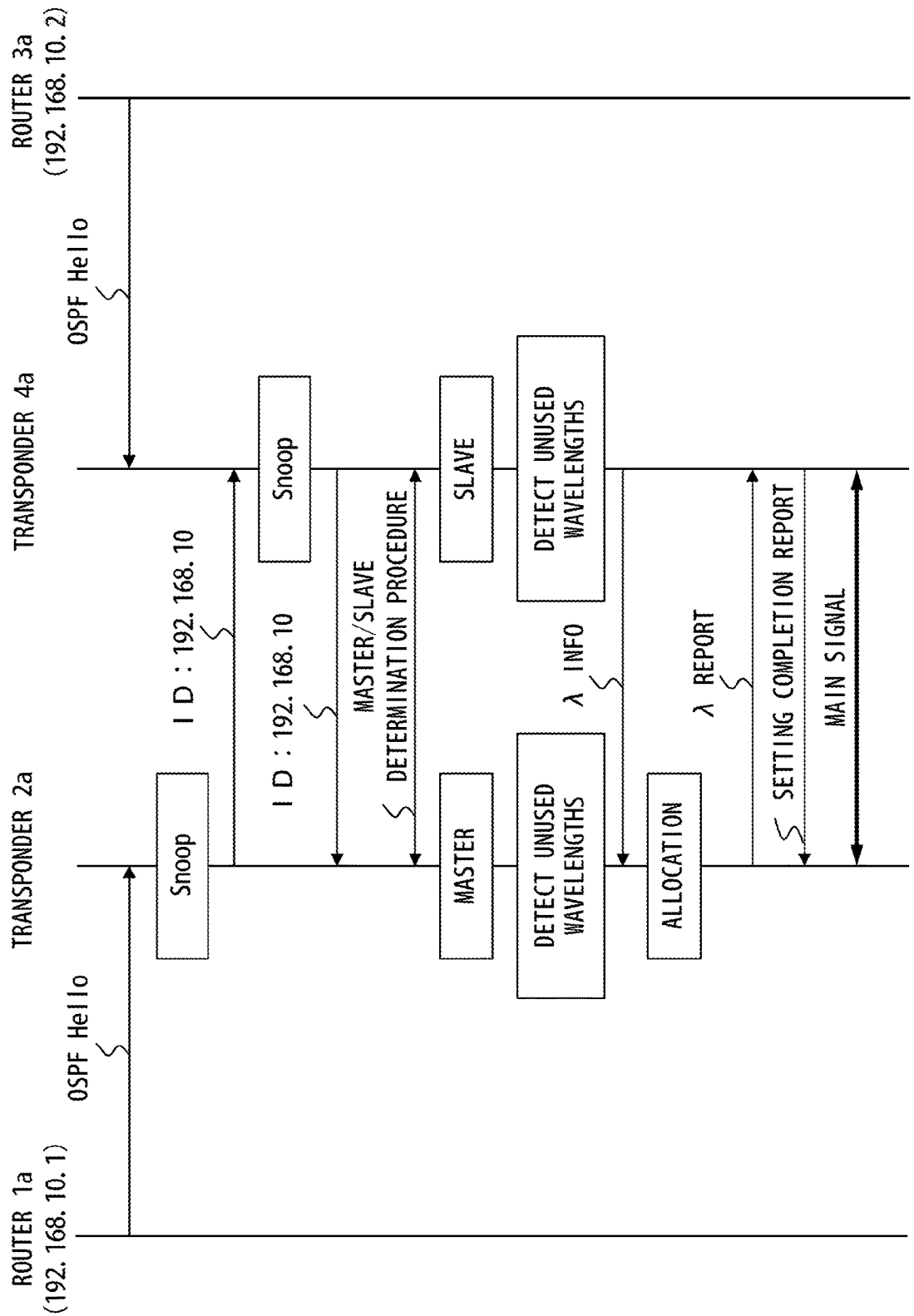
F I G. 5

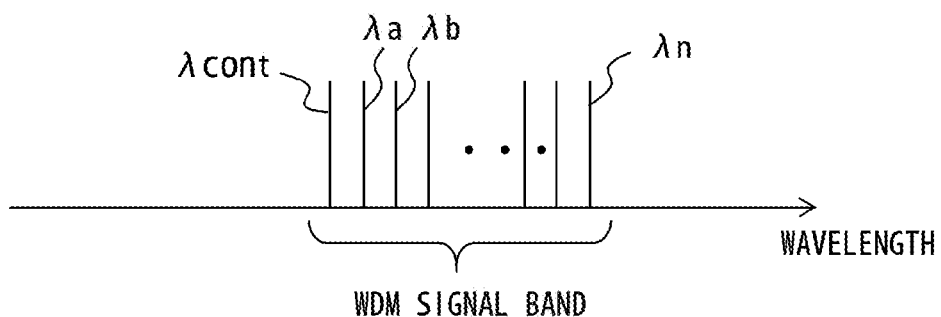
F I G. 6A
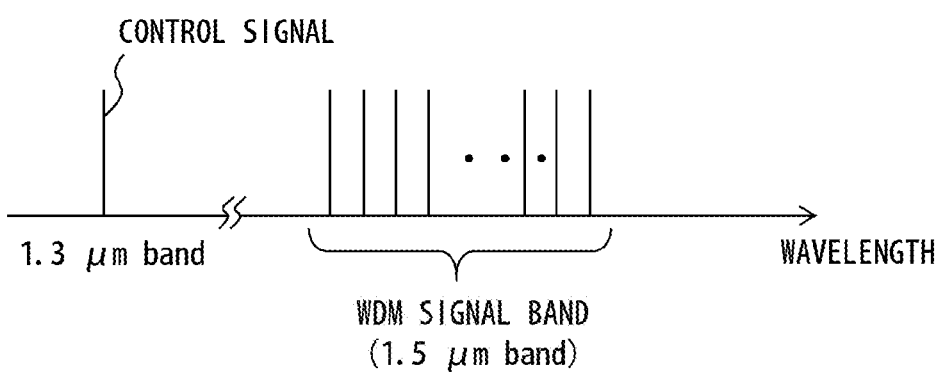
F I G. 6B

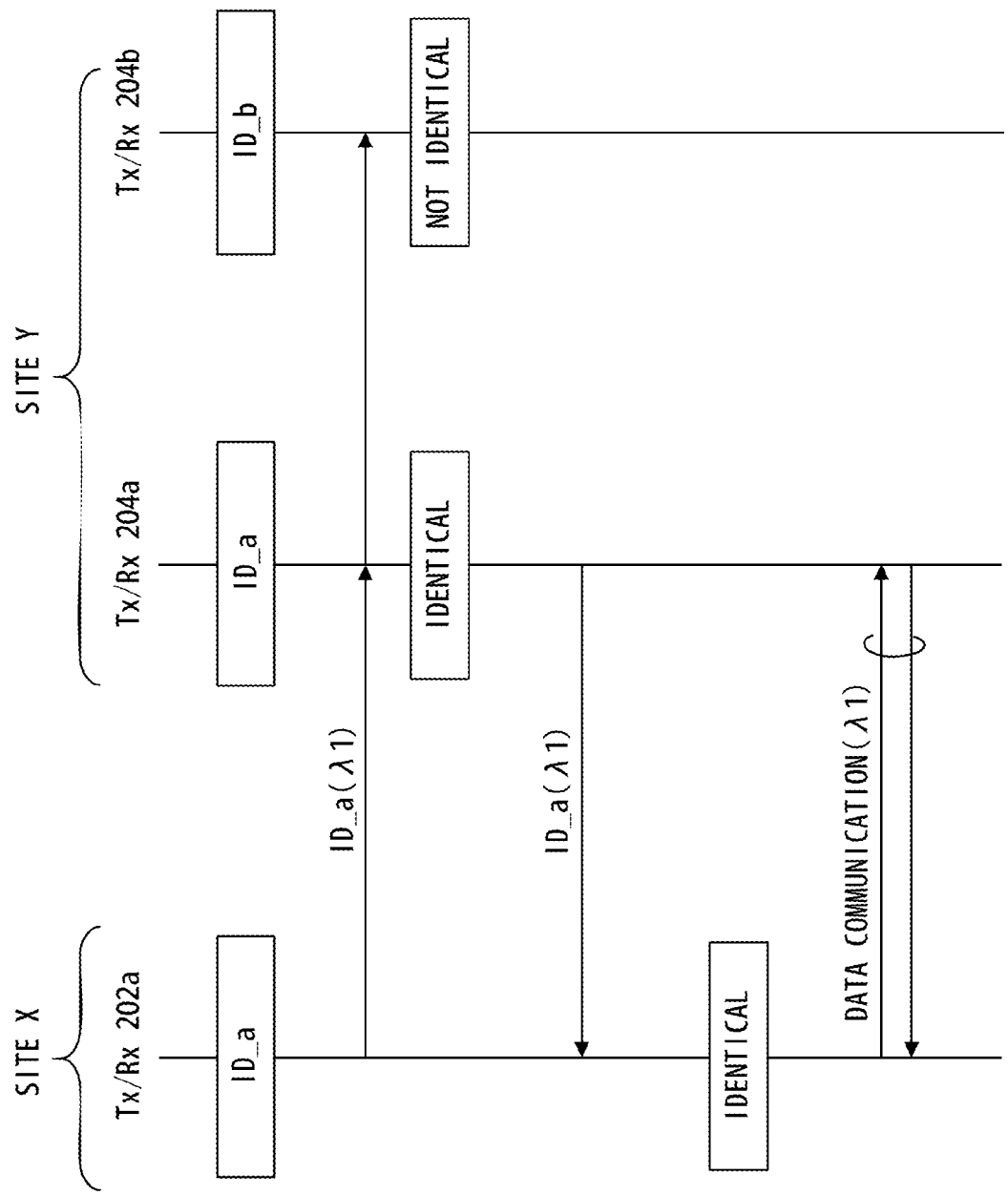
F I G. 19

F I G. 2 1 A

213nii

F I G. 2 1 B

| λ BLOCK | AVAILABL CH |
|---|---|
| #1 | ch1, 2, 3 |
| #2 | ch4, 5, 6 |
| #3 | ch7, 8, 9 |
| #4 | ch10, 11, 12 |

F I G. 2 1 C

| λ BLOCK | Tx/Rx ID | ID | REMAINDER | AVAILABL CH |
|---|---|---|---|---|
| #1 | #3 | 11. 12. 12 | 0 | ch1, 2, 3 |
|  | #6 | 11. 13. 12 | 0 | ch1, 2, 3 |
|  | #9 | 11. 14. 16 | 0 | ch1, 2, 3 |
| #2 | #4 | 11. 12. 13 | 1 | ch4, 5, 6 |
|  | #7 | 11. 13. 13 | 1 | ch4, 5, 6 |
|  | #10 | 11. 14. 17 | 1 | ch4, 5, 6 |
| #3 | #1 | 11. 12. 10 | 2 | ch7, 8, 9 |
|  | #8 | 11. 13. 14 | 2 | ch7, 8, 9 |
|  | #11 | 11. 14. 18 | 2 | ch7, 8, 9 |
| #4 | #2 | 11. 12. 11 | 3 | ch10, 11, 12 |
|  | #5 | 11. 13. 11 | 3 | ch10, 11, 12 |
|  | #12 | 11. 14. 19 | 3 | ch10, 11, 12 |

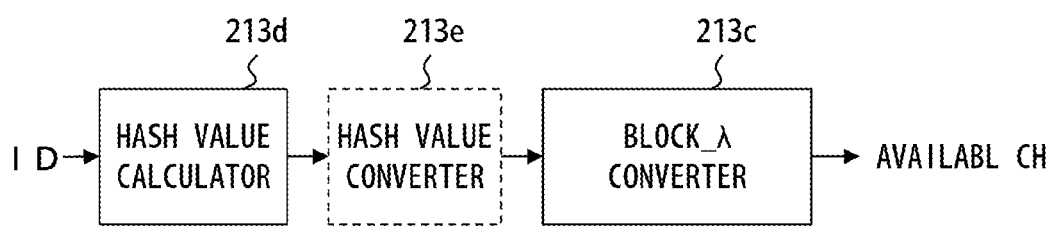
F I G. 24

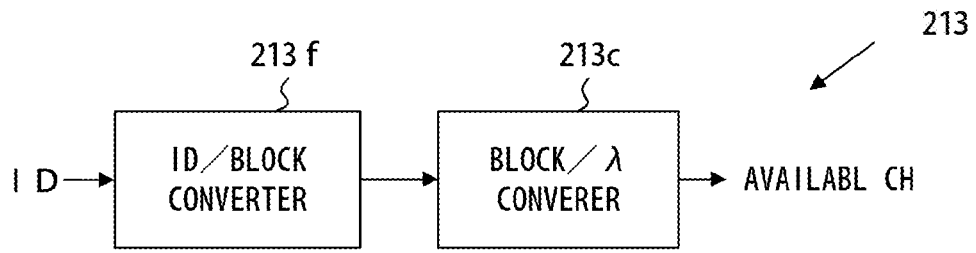
F I G. 25A
| I D | λ BLOCK |
|---|---|
| 11. 12. 11 | #1 |
| 11. 12. 12 | #2 |
| 11. 12. 101 | #1 |
| 11. 12. 102 | #2 |
| 11. 12. 201 | #3 |
F I G. 25B
| I D | AVAILABL CH |
|---|---|
| 11. 12. 11 | ch1, 2, 3, 4 |
| 11. 12. 12 | ch5, 6, 7, 8 |
| 11. 12. 101 | ch1, 2, 3, 4 |
| 11. 12. 102 | ch5, 6, 7, 8 |
| 11. 12. 201 | ch9, 10, 11, 12 |
F I G. 25C

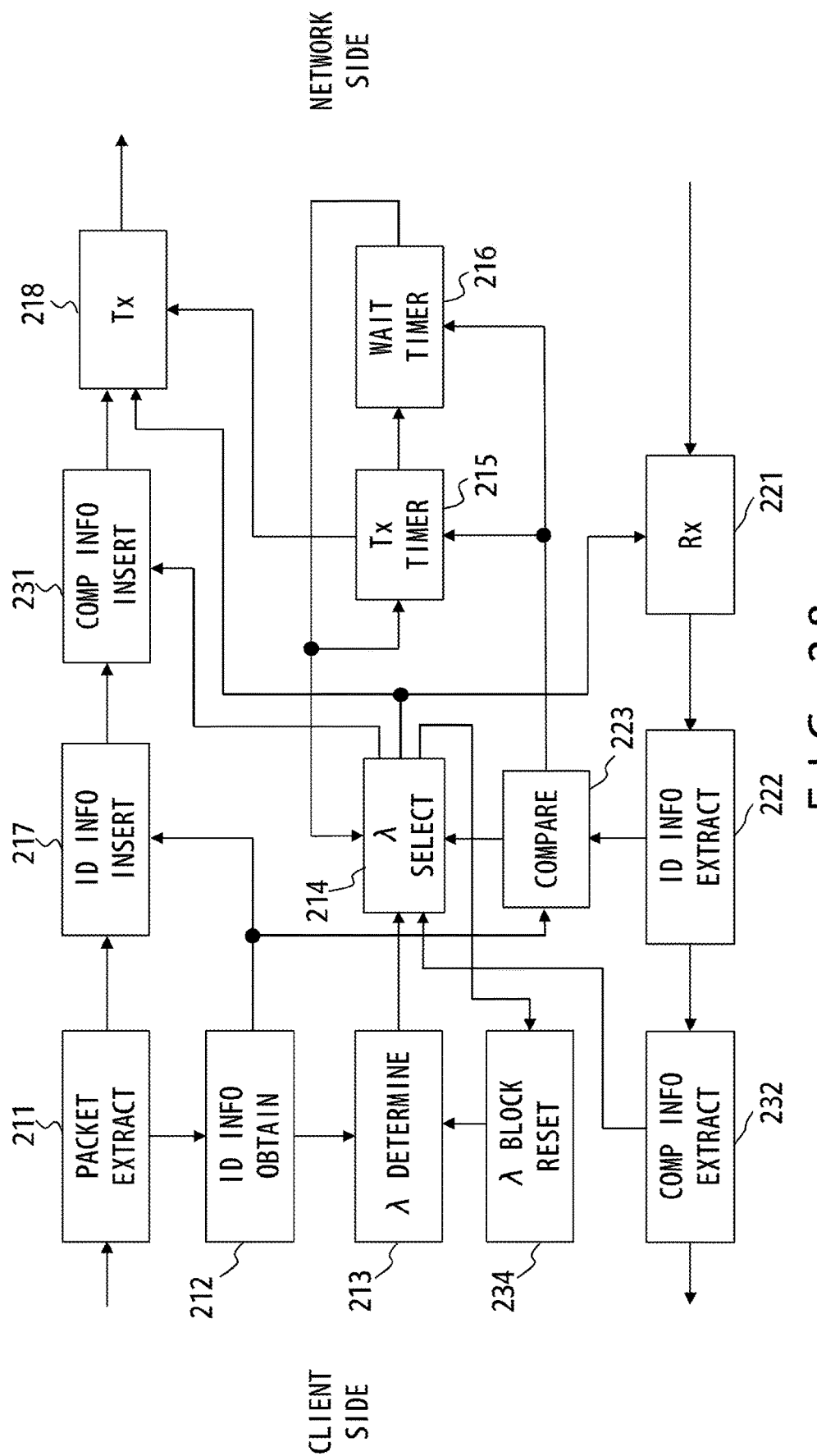
F I G. 28

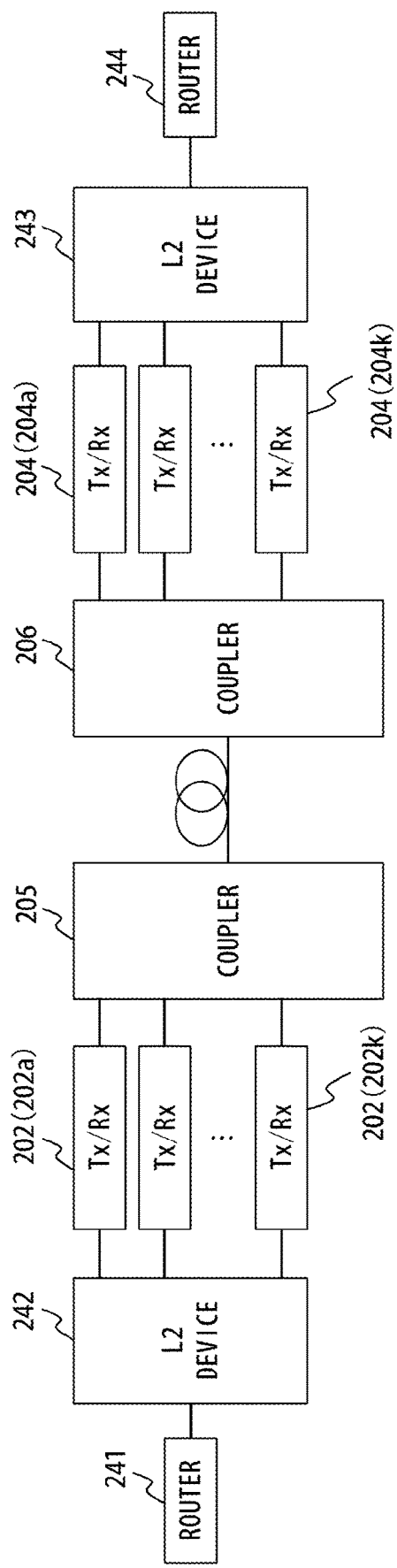
F I G. 29

OPTICAL TRANSMISSION DEVICE, OPTICAL TRANSMISSION METHOD AND OPTICAL TRANSMISSION SYSTEM

CROSS-REFERENCE TO RELATED APPLICATIONS

This application is based upon and claims the benefit of priority of the prior Japanese Patent Application No. 2018-014840, filed on Jan. 31, 2018 and the prior Japanese Patent Application No. 2018-132020, filed on Jul. 12, 2018, the entire contents of which are incorporated herein by reference.

FIELD

The embodiments discussed herein are related to a device, a method and a system for transmitting a wavelength division multiplexed optical signal.

BACKGROUND

In recent years, a demand for point-to-point (P-to-P) optical networks with a large capacity has been increased among data center companies. A large-capacity P-to-P optical network is provided using, for example, a wavelength division multiplexing (WDM) technique. In WDM transmissions, a plurality of optical paths with different wavelengths are multiplexed.

FIGS. 1A and 1B illustrate exemplary configurations of a WDM transmission system. In the example depicted in FIG. 1A, an arrayed waveguide (AWG) is provided at each site, and a plurality of transponders (TRs) are connected to each AWG. Each transponder accommodates a client or a router and transmits/receives an optical signal to/from a correspondent transponder at another site. Each transponder uses a different wavelength.

In the example depicted in FIG. 1B, a wavelength selection switch (WSS) is provided at each site, and a plurality of transponders (TRs) are connected to each WSS. As in the configuration depicted in FIG. 1A, each transponder accommodates a client or a router and transmits/receives an optical signal to/from a correspondent transponder at another site. Each transponder uses a different wavelength. However, the WDM transmission system illustrated in FIG. 1B includes an optical network controller. The optical network controller centrally manages the entirety of the network. For example, the optical network controller controls a wavelength used by each transponder and wavelength selection for the WSSs.

As a related technique, a technique has been proposed for facilitating addition or removal of a child device in a CWDM system in which communications are performed between a parent device and a plurality of child devices (e.g., Japanese Laid-open Patent Publication No. 2012-209818). An optical network control apparatus intended to enhance the efficiency of utilization of an optical frequency band has also been proposed (e.g., International Publication Pamphlet No. WO 2015/162874). In addition, related techniques are also described in Japanese Laid-open Patent Publication Nos. 2010-41444, 2008-54093, and 2007-124568.

In the configuration depicted in FIG. 1A, an available wavelength is determined for each port of the AWGs. Hence, when, for example, wavelength $\lambda 1$ is allocated to a communication between clients x1 and y1, a transponder accommodating the client x1 and a transponder accommodating the client y1 each need to be connected to a port corresponding to wavelength $\lambda 1$. Thus, in the configuration depicted in FIG. 1A, an optical path cannot be flexibly set or changed.

In the configuration depicted in FIG. 1B, an optical path can be flexibly set or changed. However, some users may desire a configuration that does not need to be provided with an optical network controller for centrally managing the entirety of a network.

SUMMARY

According to an aspect of the present invention, an optical transmission device is provided at a first site in an optical transmission system that transmits a wavelength division multiplexed optical signal between the first site and a second site. The optical transmission device includes: an optical transmitter configured to transmit a first optical signal that includes first ID information to the second site using a first wavelength; and an optical receiver configured to receive a second optical signal that includes second ID information and that is transmitted using the first wavelength from the second site. When the first ID information matches the second ID information extracted from the second optical signal, the optical transmitter transmits a wavelength report that indicates a second wavelength to the second site using the first wavelength, the second wavelength being a wavelength that has not been used in the optical transmission system. When the optical receiver receives a completion report that indicates the wavelength report has been received at the second site, the completion report being transmitted using the first wavelength, the optical transmitter transmits an optical signal to the second site using the second wavelength, and the optical receiver ceases to receive an optical signal of the first wavelength from the second site.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B illustrate exemplary configurations of a WDM transmission system;

FIG. 4 illustrates an example of a wavelength allocation sequence;

FIG. 5 illustrates an example of a wavelength allocation sequence in accordance with a first embodiment;

FIGS. 6A and 6B illustrate examples of arrangements of wavelengths for transmitting a control signal;

FIG. 19 illustrates the outline of a wavelength selection sequence in accordance with a second embodiment;

FIG. 24 illustrates a variation of an available wavelength determination unit;

FIGS. 25A-25C illustrate another variation of an available wavelength determination unit;

FIG. 28 illustrates still another example of a variation of an optical transceiver; and FIG. 29 illustrates an example of a configuration for implementing link aggregation.

DESCRIPTION OF EMBODIMENTS

Figure 2:
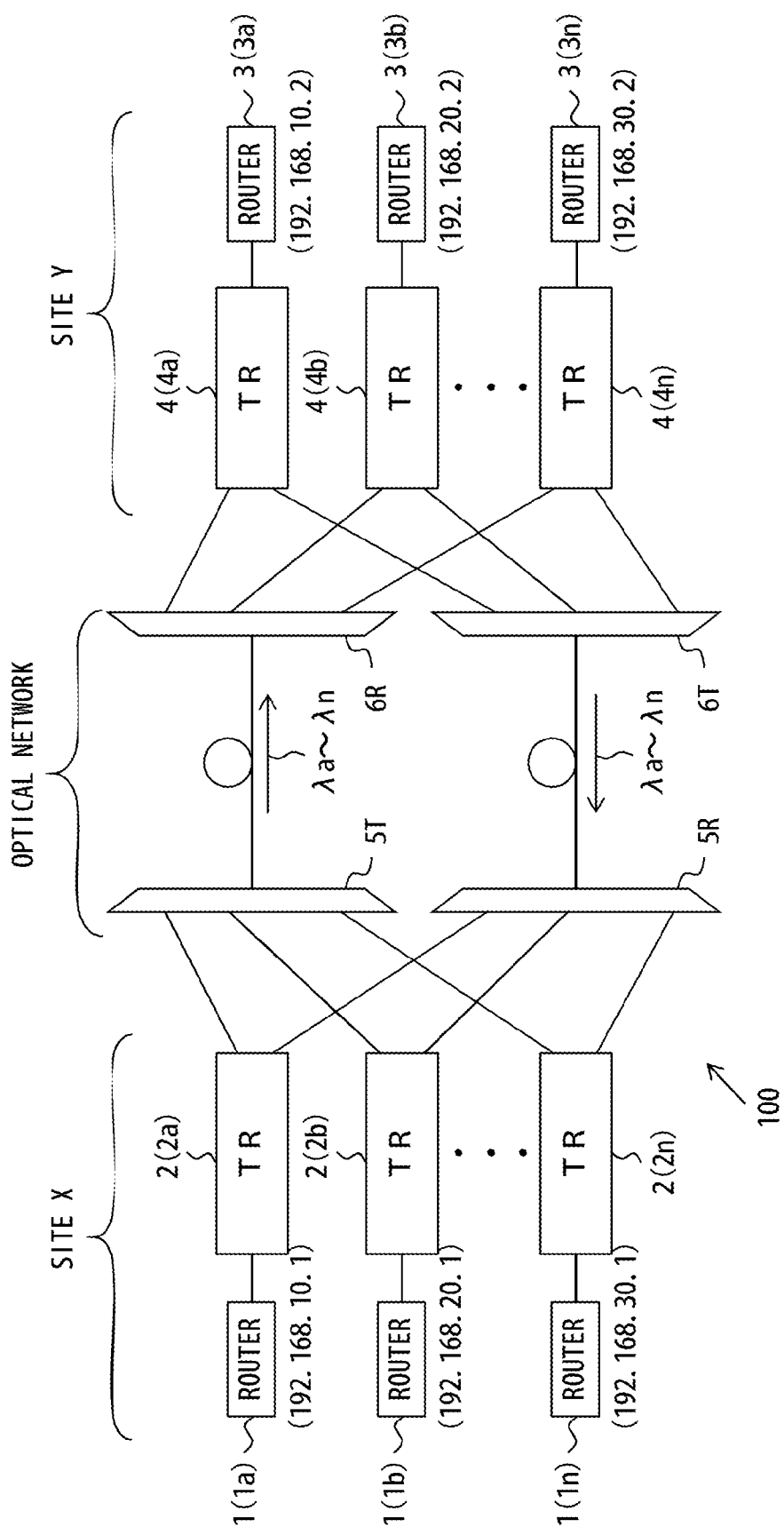
FIG. 2 illustrates an example of an optical transmission system.

FIG. 2 illustrates an example of an optical transmission system in accordance with embodiments of the present invention. As depicted in FIG. 2, an optical transmission system 100 in accordance with embodiments of the invention transmits wavelength division multiplexed (WDM) signals between sites X and Y.

A plurality of routers and a plurality of transponders are provided at each site. In particular, a plurality of routers 1 (1a-1n) and a plurality of transponders 2 (2a-2n) are provided at the site X. A plurality of routers 3 (3a-3n) and a plurality of transponders 4 (4a-4n) are provided at the site Y.

The router 1 guides to, a corresponding transponder 2, a client signal to be transmitted to the site Y and guides a client signal output from the corresponding transponder 2 to a client. Similarly, the router 3 guides to, a corresponding transponder 4, a client signal to be transmitted to the site X and guides a client signal output from the corresponding transponder 4 to a client.

The transponder 2 transmits a client signal input from a corresponding router 1 to the site Y and outputs a client signal received from the site Y to the corresponding router 1. In this case, the transponder 2 generates an optical signal for transmitting the client signal and transmits this optical signal to the site Y. The transponders 2a-2n may be implemented within one device (i.e., a WDM transmission device). Similarly, the transponder 4 transmits a client signal input from a corresponding router 3 to the site X and outputs a client signal received from the site X to the corresponding router 3. In this case, the transponder 4 generates an optical signal for transmitting the client signal and transmits this optical signal to the site X. The transponders 4a-4n may be implemented within one device (i.e., a WDM transmission device). Note that each of the transponders 2 and 4 is an example of the optical transmission device (or the optical transceiver).

The transponders 2a-2n each transmit a client signal to the site Y using a different wavelength. Similarly, the transponders 4a-4n each transmit a client signal to the site X using a different wavelength.

In this example, signals are transmitted bidirectionally between the routers 1 and 3. In the example depicted in FIG. 2, signals are transmitted bidirectionally between the routers 1a and 3a, signals are transmitted bidirectionally between the routers 1b and 3b, and signals are transmitted bidirectionally between the routers 1n and 3n. In this case, a transmission wavelength of the transponder 2a connected to the router 1a and a transmission wavelength of the transponder 4a connected to the router 3a are controlled to be identical with each other. Similarly, a transmission wavelength of the transponder 2b and a transmission wavelength of the transponder 4b are identical with each other, and a transmission wavelength of the transponder 2n and a transmission wavelength of the transponder 4n are identical with each other.

In the example depicted in FIG. 2, the transponder 2a transmits an optical signal of wavelength λa to the site Y. This optical signal carries a client signal. An optical signal of wavelength λi may hereinafter be referred to as "optical signal λi" (i=a to n). A path to which wavelength λi has been allocated may be referred to as "optical path λi" or "wavelength path λi". Thus, the transponder 2a transmits an optical signal λa to the site Y. Similarly, the transponders 2b-2n respectively transmit optical signals λb-λn to the site Y. The transponders 4a-4n respectively transmit optical signals λa-λn to the site X.

An optical coupler 5T generates a WDM signal by combining optical signals λa-λn output from the transponders 2a-2n. The WDM signal generated by the optical coupler 5T is transmitted to the site Y over an optical network. An optical coupler 6R splits and guides the WDM signal received from the site X to the transponders 4a-4n. In particular, the optical coupler 6R functions as an optical splitter to guide an identical WDM signal to each of the transponders 4a-4n.

Similarly, an optical coupler 6T generates a WDM signal by combining optical signals λa-λn output from the transponders 4a-4n. The WDM signal generated by the optical coupler 6T is transmitted to the site X over the optical network. An optical coupler 5R splits and guides the WDM signal received from the site Y to the transponders 2a-2n. In particular, the optical coupler 5R functions as an optical splitter to guide an identical WDM signal to each of the transponders 2a-2n.

The optical couplers 5T and 5R may be provided at the site X or may belong to the optical network. Similarly, the optical couplers 6T and 6R may be provided at the site Y or may belong to the optical network.

In the optical transmission system 100 illustrated in FIG. 2, each of the transponders 2a-2n and 4a-4n includes a function to select a wavelength that has not been used in the optical transmission system 100. Each of the transponders 2a-2n and 4a-4n transmits a client signal to a correspondent site using the selected wavelength. Each of the transponders 2a-2n and 4a-4n extracts an optical signal of the selected wavelength from a WDM signal received from the correspondent site.

Assume, for example, that in a case where a client signal is transmitted between the routers 1a and 3a, the transponder 2a (or transponder 4a) has selected wavelength λa. In this situation, the transponder 2a generates an optical signal λa from a client signal supplied from the router 1a and transmits the optical signal λa to the site Y. Then, the transponder 4a recovers the client signal by extracting the optical signal λa from a WDM signal obtained by multiplexing the optical signals λa-λn. The recovered client signal is guided from the transponder 4a to the router 3a. Similarly, the transponder 4a generates an optical signal λa from a client signal supplied from the router 3a and transmits the optical signal λa to the site X. Then, the transponder 2a recovers the client signal by extracting the optical signal λa from a WDM signal obtained by multiplexing the optical signals λa-λn. The recovered client signal is guided from the transponder 2a to the router 1a.

As described above, each transponder includes a function to select an unused wavelength, and hence the optical transmission system 100 does not need to include a controller for centrally managing the network. Optical signals generated by individual transponders are combined using an optical coupler. Unlike in the case of AWGs, each port of the optical couplers is configured to transmit arbitrary wavelengths. Hence, each transponder can select a desired wavelength, and each router can be connected to a desired transponder.

Figure 3:
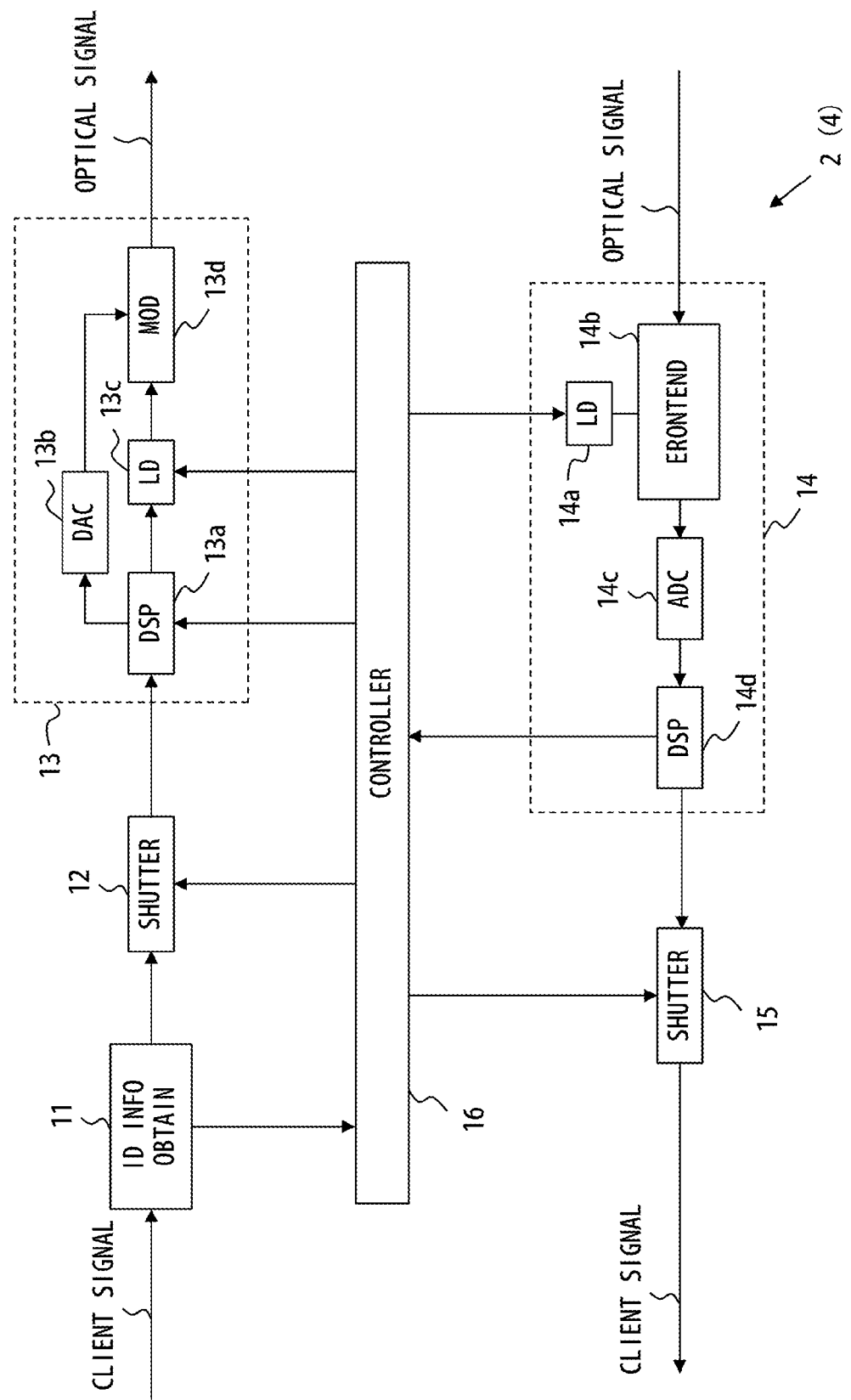
FIG. 3 illustrates an example of a transponder.

FIG. 3 illustrates an example of a transponder. The following describes the configuration and operations of the transponder 2. However, the transponders 2 and 4 are almost identical with each other. Accordingly, descriptions of the transponder 4 are omitted herein.

As depicted in FIG. 3, the transponder 2 includes an ID information obtaining unit 11, a shutter 12, a transmitter 13, a coherent receiver 14, a shutter 15, and a controller 16. The transponder 2 may include other elements or functions that are not illustrated in FIG. 3.

The ID information obtaining unit 11 includes a Snoop function and obtains ID information from an input client signal. The following descriptions are based on the assumption that a client signal is not limited to a user data signal but may represent a signal input from the router 1 to the transponder 2. Client signals include, for example, signals generated by the router 1 for neighbor discover/neighbor check. A neighbor discovery/neighbor check protocol is, for example, open shortest path first (OSPF) Hello, link layer discovery protocol (LLDP), or PING. ID information may be referred to as an "identifier".

ID information identifies a communication related to a source of a client signal (i.e., router 1). For example, when a client signal includes an IP address of a source, the ID information obtaining unit 11 may obtain a source IP address or a portion of the source IP address. For example, the value of a network address section is obtained as a portion of the IP address. The network address section identifies a subnet under the router 1. ID information obtained by the ID information obtaining unit 11 is supplied to the controller 16.

In accordance with an instruction from the controller 16, the shutter 12 may block and prevent a client signal from being input to the transmitter 13. For example, while a wavelength allocation sequence (this will be described hereinafter) is performed, the shutter 12 blocks a client signal in accordance with an instruction from the controller 16. When the transponder 2 transmits a client signal to a correspondent site, the shutter 12 allows passage of the client signal in accordance with an instruction from the controller 16.

In this example, the transmitter 13 includes a digital signal processor (DSP) 13a, a digital/analog converter (DAC) 13b, a light source (LD) 13c, and a modulator 13d. The DSP 13a generates a driving signal from a client signal according to a designated modulation scheme. The DSP 13a may generate a driving signal from a control signal supplied from the controller 16. The digital/analog converter 13b converts a driving signal generated by the DSP 13a into an analog signal. The light source 13c is a wavelength-tunable light source and generates continuous wave light with a wavelength designated by the controller 16. The modulator 13d modulates the continuous wave light generated by the light source 13c using a driving signal so as to generate a modulated optical signal. An optical signal generated by the transmitter 13 is transmitted to a correspondent site over an optical network.

The coherent receiver 14 includes a local light source (LO) 14a, a frontend circuit 14b, an analog/digital converter (ADC) 14c, and a digital signal processor (DSP) 14d. The local light source 14a is a wavelength-tunable light source and generates local light with a wavelength designated by the controller 16. The frontend circuit 14b extracts, from input light, light of the same wavelength as the local light generated by the local light source 14a. Then, the frontend circuit 14b generates an electric field information signal indicating electric field information of the light extracted from the input light. The analog/digital converter 14c converts the electric field information signal generated by the frontend circuit 14b into a digital signal. The DSP 14d recovers a control signal and/or a client signal from the electric field information signal. When a control signal is recovered, the DSP 14d supplies the control signal to the controller 16.

In accordance with an instruction from the controller 16, the shutter 15 can block and prevent a received signal from being guided to the router 1. For example, while a wavelength allocation sequence (this will be described hereinafter) is performed, the shutter 15 blocks the received signal in accordance with an instruction from the controller 16. When the transponder 2 receives a client signal from a correspondent site, the shutter 15 allows passage of the received signal (i.e., the client signal) in accordance with an instruction from the controller 16.

The controller 16 performs a wavelength allocation sequence wherein a wavelength to be used by the transponder 2 is selected. For example, when ID information is received from the ID information obtaining unit 11 before the transponder 2 starts a data communication, the controller 16 starts the wavelength allocation sequence.

The controller 16 may generate a control signal that includes ID information obtained from an input client signal and transmit the control signal to a correspondent site using the transmitter 13. Using the coherent receiver 14, the controller 16 may detect a wavelength that has not been used within the optical transmission system 100. In this case, the controller 16 controls an oscillation wavelength of the local light source 14a so as to scan a WDM signal band. Under the control of the controller 16, the local light source 14a sequentially generates rays of continuous wave light that each correspond to each wavelength channel of a WDM signal. According to an output signal of the DSP 14d, the controller 16 sequentially decides whether each wavelength channel has been used. When, for example, the output signal of the DSP 14d has an amplitude that is less than a specified threshold while the local light source 14a is generating continuous wave light with wavelength λa, the controller 16 decides that wavelength λa has been unused. The controller 16 determines a wavelength to be used by the transponder 2 from among unused wavelengths that have been detected. While the wavelength allocation sequence described above is performed, the controller 16 performs a control such that the shutters 12 and 15 block signals.

The controller 16 is implemented by, for example, a processor system that includes a processor and a memory. The processor executes a program stored in the memory so as to provide a function related to the wavelength allocation sequence. However, the processor may provide a function that is not related to the wavelength allocation sequence. Some of the functions of the controller 16 may be implemented by a hardware circuit.

FIG. 4 illustrates an example of a wavelength allocation sequence. In this example, clients within each subnet of a site X communicate with clients within a corresponding subnet of a site Y. In the example depicted in FIG. 2, a subnet is identified by the value of the network address section of the IP address of each of the routers 2 and 4. For example, the IP address of the router 1a is 192.168.10.1, and the IP address of the router 3a is 192.168.10.2. Let upper 24 bits of an IP address be a network address section. In this case, clients under the router 1a and clients under the router 3a belong to the same subnet (i.e., a subnet identified as 192.168.10). Clients under the router 1a communicate with clients under the router 3a. Accordingly, an optical path needs to be established between the transponders 2a and 4a.

In this example, each of the routers 1 and 3 periodically outputs an OSPF Hello packet. The routers 1 and 3 use the OSPF Hello packet to report the presence thereof to adjacent nodes. Accordingly, the IP address of the source of the OSPF Hello packet is stored in a data region of the OSPF Hello packet.

The IP address of the router 1a is, for example, 192.168.10.1 as described above. Accordingly, this IP address is stored in the data region of an OSPF Hello packet output from the router 1a. Similarly, 192.168.20.1 is stored in the data region of an OSPF Hello packet output from the router 1b, and 192.168.30.1 is stored in the data region of an OSPF Hello packet output from the router 1n.

Upon receipt of an OSPF Hello packet from the router 1a, the transponder 2a performs Snoop for the data region of the packet. Then, the transponder 2a obtains the IP address of the source of the OSPF Hello packet (i.e., router 1a). In this case, only a network address section of the IP address of the router 1a may be obtained by the router 1a.

Subsequently, the transponder 2a detects wavelengths that have not been used in the optical transmission system 100. Unused wavelengths are detected by, for example, scanning the oscillation wavelength of the local light source 14a within a WDM signal band, as described above. The transponder 2a selects a wavelength to be used by the transponder 2a from the detected unused wavelengths in accordance with a policy determined in advance. In one example, the shortest wavelength of the unused wavelengths is selected.

Similarly, the transponder 4a obtains an IP address of the router 3a or a portion thereof from an OSPF Hello packet transmitted from the router 3a. The transponder 4a also detects unused wavelengths and selects a wavelength to be used by the transponder 4a from the detected wavelengths.

Then, the transponder 2a transmits ID information and wavelength information to the site Y. In this example, the ID information indicates the value of the network address section of the IP address of the router 1a. The wavelength information indicates the wavelength selected for the transponder 2a. Similarly, the transponder 4a transmits ID information and wavelength information to the site X. In this example, the ID information indicates the value of the network address section of the IP address of the router 3a. The wavelength information indicates the wavelength selected for the transponder 4a. In this example, ID information and wavelength information are transmitted using a wavelength λcont designated in advance to transmit a control signal in a WDM signal.

In the example depicted in FIG. 2, upon receipt of an OSPF Hello packet from the router 1a in the site X, the transponder 2a obtains the IP address 192.168.10.1 of the router 1a from the received packet. Assume that wavelength λa has not been used in the optical transmission system. In this case, the transponder 2a transmits "ID information: 192.168.10" and "wavelength information: λa" to the site Y. Meanwhile, upon receipt of an OSPF Hello packet from the router 3a in the site Y, the transponder 4a obtains the IP address 192.168.10.2 of the router 3a from the received packet. Assume that wavelength λa has not been used in the optical transmission system. In this case, the transponder 4a transmits "ID information: 192.168.10" and "wavelength information: λa" to the site X.

The transponder 2a receives a WDM signal transmitted from the site Y over the optical network. The WDM signal transmitted from the site Y is guided by the optical coupler 5R to all of the transponders 2a-2n provided at the site X. The transponder 2a extracts ID information and wavelength information from a control channel within the received WDM signal.

When the value of the network section of the IP address of the router 1a matches the ID information received from the site Y, the transponder 2a controls the coherent receiver 14 so as to receive an optical signal having a wavelength designated by the received wavelength information (i.e., λa). The transponder 2a controls the transmitter 13 so as to transmit an optical signal having a wavelength selected by the transponder 2a (i.e., λa).

Similarly, when the value of the network section of the IP address of the router 3a matches the ID information received from the site X, the transponder 4a controls the coherent receiver 14 so as to receive an optical signal having a wavelength designated by the received wavelength information (i.e., λa). The transponder 4a controls the transmitter 13 so as to transmit an optical signal having a wavelength selected by the transponder 4a (i.e., λa).

In accordance with the wavelength allocation procedure described above, wavelength λa is allocated to the communication between the transponders 2a and 4a. As a result, a client under the router 1a and a client under the router 3a can perform a bidirectional communication via wavelength path λa.

In the procedure depicted in FIG. 4, however, an inappropriate wavelength allocation could be performed. Assume, for example, that neither wavelength λ1 nor λ2 has been used in the optical transmission system. In addition, in the site X, an OSPF Hello packet is transmitted from the router 1b, and then an OSPF Hello packet is transmitted from the router 1n. In the site Y, an OSPF Hello packet is transmitted from the router 3n, and then an OSPF Hello packet is transmitted from the router 3b. In this case, for example, λ1 could be allocated to a path for transmitting a signal from the transponder 2b to the transponder 4b, and λ2 could be allocated to a path for transmitting a signal from the transponder 4b to the transponder 2b. Similarly, λ2 could be allocated to a path for transmitting a signal from the transponder 2n to the transponder 4n, and λ1 could be allocated to a path for transmitting a signal from the transponder 4n to the transponder 2n. That is, a pair of optical paths for a bidirectional communication could each have a different wavelength.

Moreover, when, for example, the routers 1b and 1n transmit OSPF Hello packets almost concurrently, the transponders 2b and 2n could select the same wavelength. In this case, a communication cannot be performed between the sites X and Y.

Accordingly, the optical transmission device in accordance with embodiments of the present invention includes a function to avoid an inappropriate wavelength allocation such as that described above.

First Embodiment

FIG. 5 illustrates an example of a wavelength allocation sequence in accordance with the first embodiment of the present invention. In the example depicted in FIG. 5, clients within each subnet of a site X communicates with clients within a corresponding subnet of a site Y, as in the example depicted in FIG. 4. Each of the routers 1 and 3 periodically outputs an OSPF Hello packet.

Upon receipt of an OSPF Hello packet from the router 1a, the transponder 2a performs Snoop for the data region of the packet. In particular, the ID information obtaining unit 11 of the transponder 2a obtains the IP address of the source of the OSPF Hello packet (i.e., router 1a). Only the value of a network address section of the IP address of the router 1a may be obtained by the ID information obtaining unit 11. In this case, "192.168.10" is obtained as ID information.

The transponder 2a transmits the ID information to the site Y. In this example, control signals, including a control signal (including ID information) transmitted in the wavelength allocation sequence between the transponder 2 provided at the site X and the transponder 4 provided at the site Y, are transmitted via a wavelength path λcont designated in advance. The wavelength path λcont is set in a WDM signal band, as depicted in FIG. 6A. Accordingly, ID information obtained by the transponder 2a is transmitted to the site Y via the wavelength path λcont multiplied in a WDM signal. Assume that each transponder is configured to receive an optical signal in the wavelength path λcont while the wavelength allocation sequence is performed or while a data communication is not performed.

In the site Y, a WDM signal transmitted from the site X is guided by the optical coupler 6R to all of the transponders 4a-4n provided at the site Y. Assume that the transponder 4a is not performing a data communication. In this case, the transponder 4a waits for control information. In particular, the transponder 4a waits for a signal of signal path λcont. Accordingly, the transponder 4a can receive ID information transmitted from the transponder 2a.

Similarly, upon receipt of an OSPF Hello packet from the router 3a, the transponder 4a obtains an IP address from the received packet. In particular, the ID information obtaining unit 11 of the transponder 4a obtains "ID information: 192.168.10". The transponder 4a transmits the ID information to the site X via wavelength path λcont. As a result, the transponder 2a receives the ID information transmitted from the transponder 4a.

When the ID information obtained from the router 1a matches the ID information received from the site Y, the transponder 2a performs a master/slave determination procedure. Similarly, when the ID information obtained from the router 3a matches the ID information received from the site X, the transponder 4a performs the master/slave determination procedure.

A master/slave may be determined using, but not particularly limited to, a publicly known technique. For example, the transponders 2a and 4a each generate a random number. This number is transmitted to the correspondent device via the wavelength path λcont. The transponders 2a and 4a also each report ID information obtained in advance to the correspondent device, together with the generated number.

The transponder 2a or 4a decides to be operated as a master device when the number generated by the transponder is larger than the number reported from the correspondent device. The transponder 2a or 4a decides to be operated as a slave device when the number generated by the transponder is smaller than the number reported from the correspondent device. When the two numbers are equal, the transponders 2a and 4a perform the above-described procedure again. In the example depicted in FIG. 5, as a result, the transponder 2a is operated as a master device, and the transponder 4a is operated as a slave device.

A master/slave may be determined using another method. For example, the transponders 2a and 4a each record a reception time of an OSPF Hello packet. Subsequently, the transponders 2a and 4a each report the reception time of the OSPF Hello packet to the correspondent device. The transponder 2a or 4a decides to be operated as a master device when the reception time in the transponder itself precedes the reception time in the correspondent device.

When control information is transmitted between the transponder 2 provided at the site X and the transponder 4 provided at the site Y in the wavelength allocation sequence, the control information is transmitted together with ID information. The device on the reception side (i.e., transponder) decides whether to obtain or discard the received control information according to the ID information included in a received signal. In particular, when ID information obtained from a received OSPF Hello packet matches ID information received from a correspondent device, a transponder obtains control information received together with the ID information. In, for example, the example depicted in FIG. 5, when a signal received via wavelength path λcont includes "ID information: 192.168.10", the transponders 2a and 4a each obtain a control signal from the received signal.

In the wavelength allocation sequence, as described above, a transponder that has received control information via wavelength path λcont may use ID information transmitted together with the control information so as to decide whether to obtain the control information. Accordingly, control information transmitted from a transponder within one site to another site arrives at all transponders within this other site; ID information is transmitted together with the control information, and hence the control information is received by a transponder belonging to the same subnet. Therefore, transmitting control information with ID information added thereto to a site on a reception side is equivalent to transmitting the control information to a target transponder indicated by the ID information.

The transponders 2a and 4a each detect wavelengths that have not been used in the optical transmission system 100. The unused wavelengths are detected by scanning the oscillation wavelength of the local light source 14a for a WDM signal band, as described above.

The transponder (slave device) 4a transmits wavelength information indicating the detected unused wavelengths to the site X. The wavelength information is transmitted to the site X via wavelength path λcont. "ID information: 192.168.10" is transmitted together with the wavelength information. Thus, the transponder 4a transmits the wavelength information to the transponder 2a via wavelength path λcont.

The transponder (master device) 2a obtains the wavelength information from the transponder 4a. Accordingly, the transponder 2a determines a wavelength to be allocated to a communication between the transponders 2a and 4a (hereinafter referred to as a selected wavelength) from among common unused wavelengths of the unused wavelengths detected by the transponder 2a and the unused wavelengths indicated by the wavelength information received from the transponder 4a. In this case, for example, the shortest wavelength in the common unused wavelengths is selected as the selected wavelength.

The transponder 2a controls an oscillation wavelength of the light source 13c of the transmitter 13 so as to transmit a main signal to the correspondent site using the selected wavelength. The transponder 2a controls an oscillation wavelength of the local light source 14a of the coherent receiver 14 so as to receive an optical signal having the selected wavelength from the correspondent site.

The transponder (master device) 2a transmits a wavelength report indicating the wavelength allocated to the communication between the transponders 2a and 4a (i.e., the selected wavelength) to the site Y. In this case, the wavelength report is transmitted to the site Y via wavelength path λcont. "ID information: 192.168.10" is transmitted together with the wavelength report. In particular, the transponder 2a transmits the wavelength report to the transponder 4a via wavelength path λcont. In this case, a control signal that includes the wavelength report and the ID information is transmitted to the site Y via wavelength path λcont.

Upon receipt of the wavelength report from the transponder 2a, the transponder (slave device) 4a controls the transmitter 13 and the coherent receiver 14 in accordance with the selected wavelength designated by the wavelength report. In particular, the transponder 2a controls the oscillation wavelength of the light source 13c of the transmitter 13 so as to transmit a main signal using the selected wavelength. The transponder 2a also controls the oscillation wavelength of the local light source 14a of the coherent receiver 14 so as to receive an optical signal having the selected wavelength. Subsequently, the transponder 4a transmits a setting completion report to the transponder 2a. The setting completion report, which corresponds to a signal indicating that a control signal that includes a wavelength report has been received, is transmitted to the site X via wavelength path λcont.

Upon receipt of the setting completion report, the transponder 2a ceases the operation of receiving an optical signal via wavelength path λcont and then transmits an optical signal to the site Y using the selected wavelength (i.e., the wavelength allocated to the communication between the transponders 2a and 4a). After this, the transponders 2a and 4a bidirectionally transmit data using the selected wavelength.

As described above, the transponder in accordance with embodiments of the invention can appropriately determine a wavelength to be used for a WDM transmission even without receiving an instruction from a controller that is directed to centrally manage the network. In addition, since one of a pair of transponders connected to the same subnet (transponders 2a and 4a in FIG. 5) is operated as a master device, a wavelength is appropriately allocated to a communication between that pair of transponders. In particular, for example, a pair of optical paths for a bidirectional communication will not have different wavelengths. However, when a plurality of transponder pairs concurrently perform the wavelength allocation sequence, the transponder pairs could possibly use the same wavelength.

Figure 7:
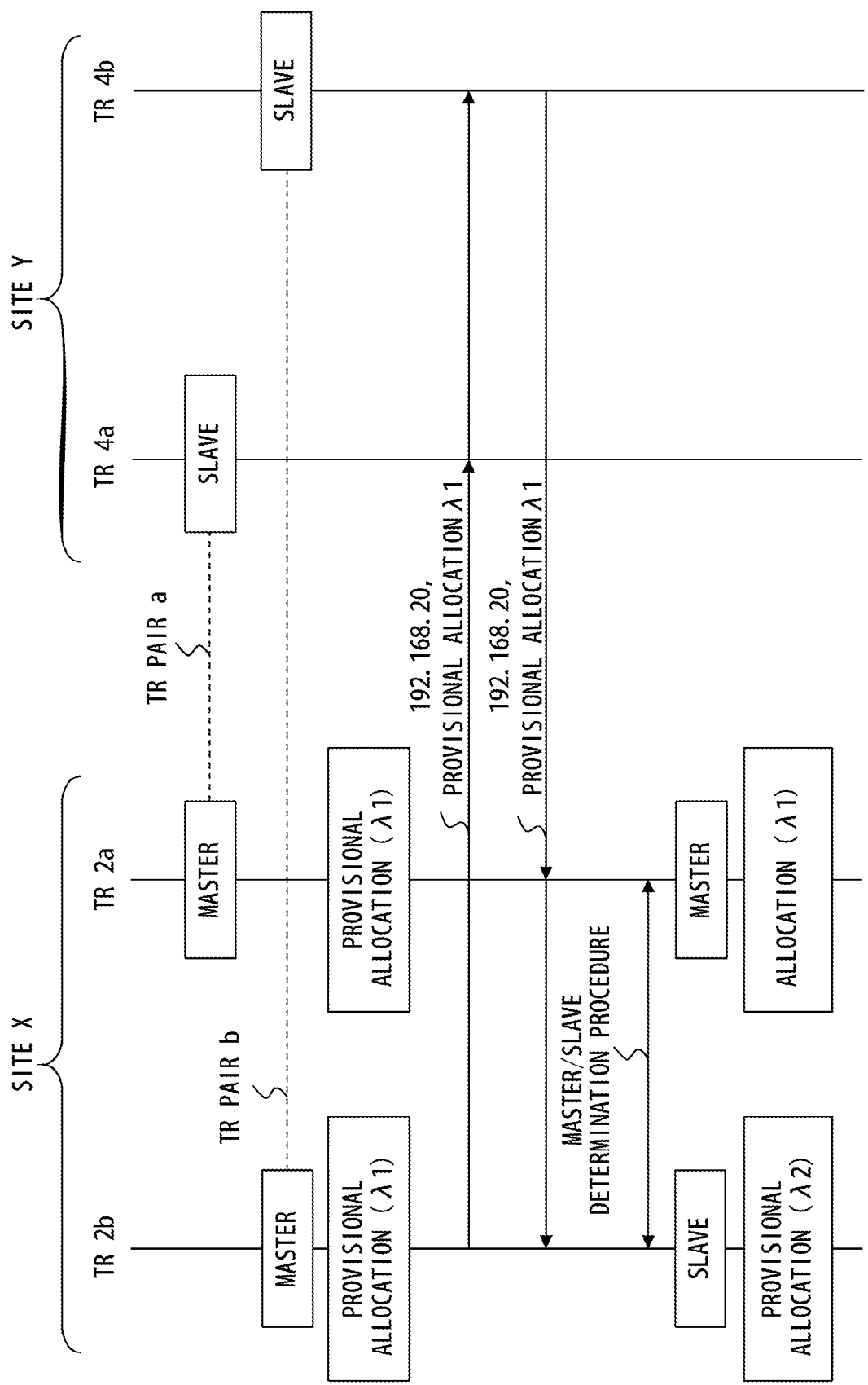
FIG. 7 illustrates an example of a method of preventing transponder pairs from using the same wavelength.

FIG. 7 illustrates an example of a method of preventing transponder pairs from using the same wavelength. In this example, the transponders 2a and 4a are connected to subnet 192.168.10, and the transponders 2b and 4b are connected to subnet 192.168.20. For a transponder pair a of the transponders 2a and 4a, the transponder 2a is operated as a master device, and the transponder 4a is operated as a slave device. Similarly, for a transponder pair b of the transponders 2b and 4b, the transponder 2b is operated as a master device, and the transponder 4b is operated as a slave device.

The transponders (master devices) 2a and 2b each provisionally determine a wavelength to be used from among unused wavelengths. In this example, both of the transponders 2a and 2b select wavelength λ1.

The transponders 2a and 2b each transmit wavelength provisional allocation information to a correspondent site. The wavelength provisional allocation information indicates the provisionally determined wavelength. The wavelength provisional allocation information is transmitted together with ID information. FIG. 7 depicts wavelength provisional allocation information transmitted from the transponder 2b. In particular, "ID information: 192.168.20" and "wavelength provisional allocation information: λ1" are transmitted from the transponder 2b to the site Y.

In the site Y, the wavelength provisional allocation information transmitted from the transponder 2b is guided to all transponders 4. In this case, the transponder 4a is connected to a subnet different from the subnet to which the source of the wavelength provisional allocation information (i.e., transponder 2b) is connected and thus discards the received wavelength provisional allocation information. Meanwhile, the transponder 4b is connected to the same subnet as the source of the wavelength provisional allocation information and thus returns the received wavelength provisional allocation information to the site X.

In the site X, the wavelength provisional allocation information returned from the transponder 4b is guided to all transponders 2. In this case, although the transponder 2a is connected to a subnet different from the subnet to which the source of the returned wavelength provisional allocation information (i.e., transponder 2b) is connected, the transponder 2a obtains the received wavelength provisional allocation information because the transponder 2a has been operated as a master device. Then, the transponder 2a compares the wavelength provisionally determined by the transponder 2a with the wavelength reported by the wavelength provisional allocation information. In this example, both of the two wavelengths are λ1.

In this case, a master/slave determination procedure is performed for a pair of the two master devices (i.e., transponders 2a and 2b). This procedure is the same as the master/slave determination procedure for a transponder pair. In the example depicted in FIG. 7, as a result, the transponder 2a is operated as a master device for the transponder pairs, and the transponder 2b is operated as a slave device for the transponder pairs. When two master devices are provided at the same site, control information communicated between the two master devices (e.g., random numbers generated in the transponders) is transmitted via, for example, a slave device provided at another site.

The transponder 2a is the master device for the transponder pairs and thus allocates the wavelength provisionally determined in advance (i.e., λ1) to a communication between the transponders 2a and 4a. After this, as described above with reference to FIG. 5, a wavelength report and a setting completion report are transmitted between the transponders 2a and 4a, and a main signal starts to be communicated. In this case, the main signal is transmitted via wavelength path λ1 between the transponders 2a and 4a.

Meanwhile, the transponder 2b is a slave device for the transponder pairs and thus selects a new wavelength from among unused wavelengths detected in advance. In FIG. 7, wavelength λ2 is newly selected. When wavelength λ2 is not provisionally allocated by another transponder pair, the transponder 2b allocates wavelength λ2 to a communication between the transponders 2b and 4b.

In the sequence depicted in FIG. 7, as described above, when a plurality of transponder pairs concurrently select the same wavelength, an adjustment is performed between these pairs. Hence, a plurality of subnets are prevented from being allocated the same wavelength.

Figure 8:
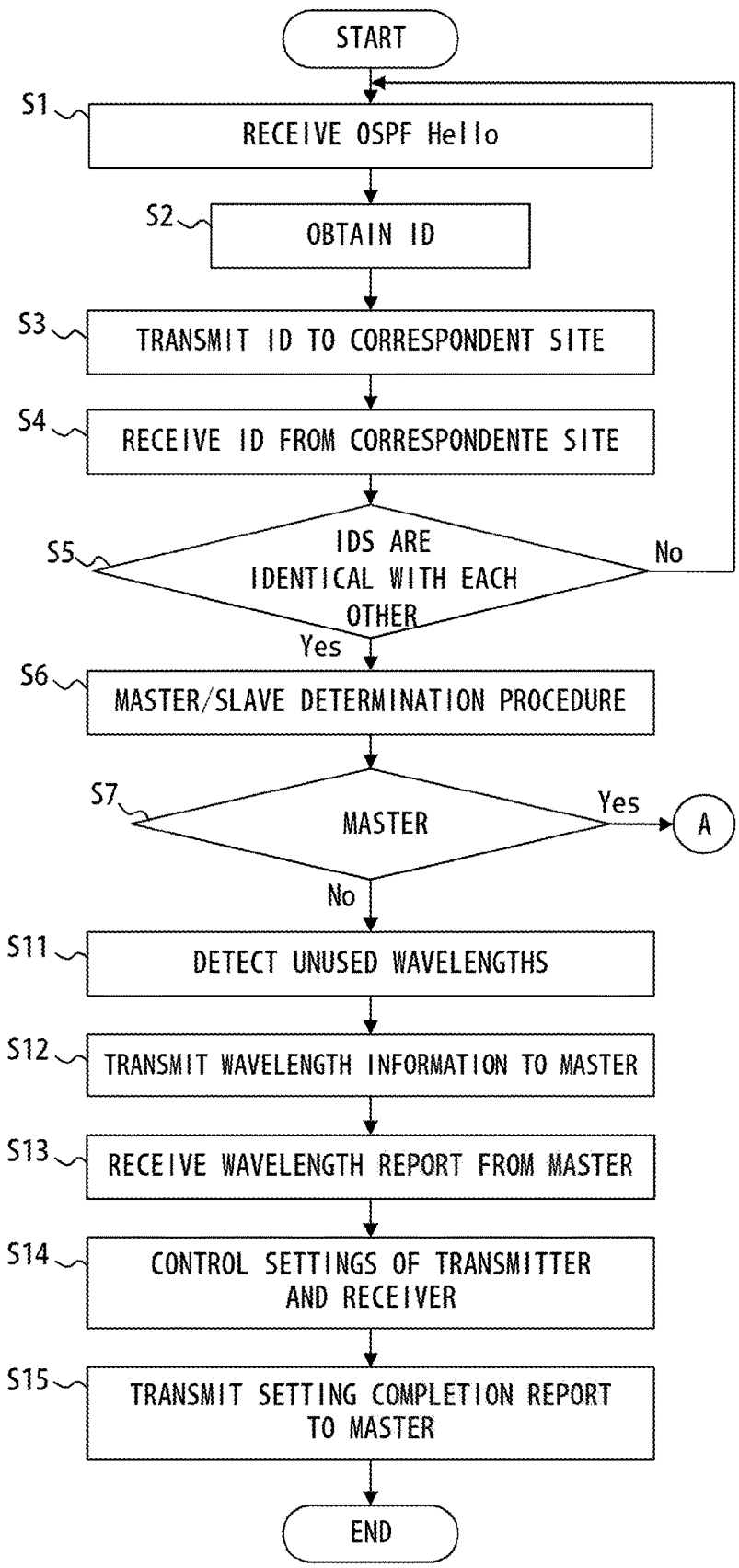
FIGS. 8 and 9 are flowcharts indicating an example of a process of a transponder.
Figure 9:
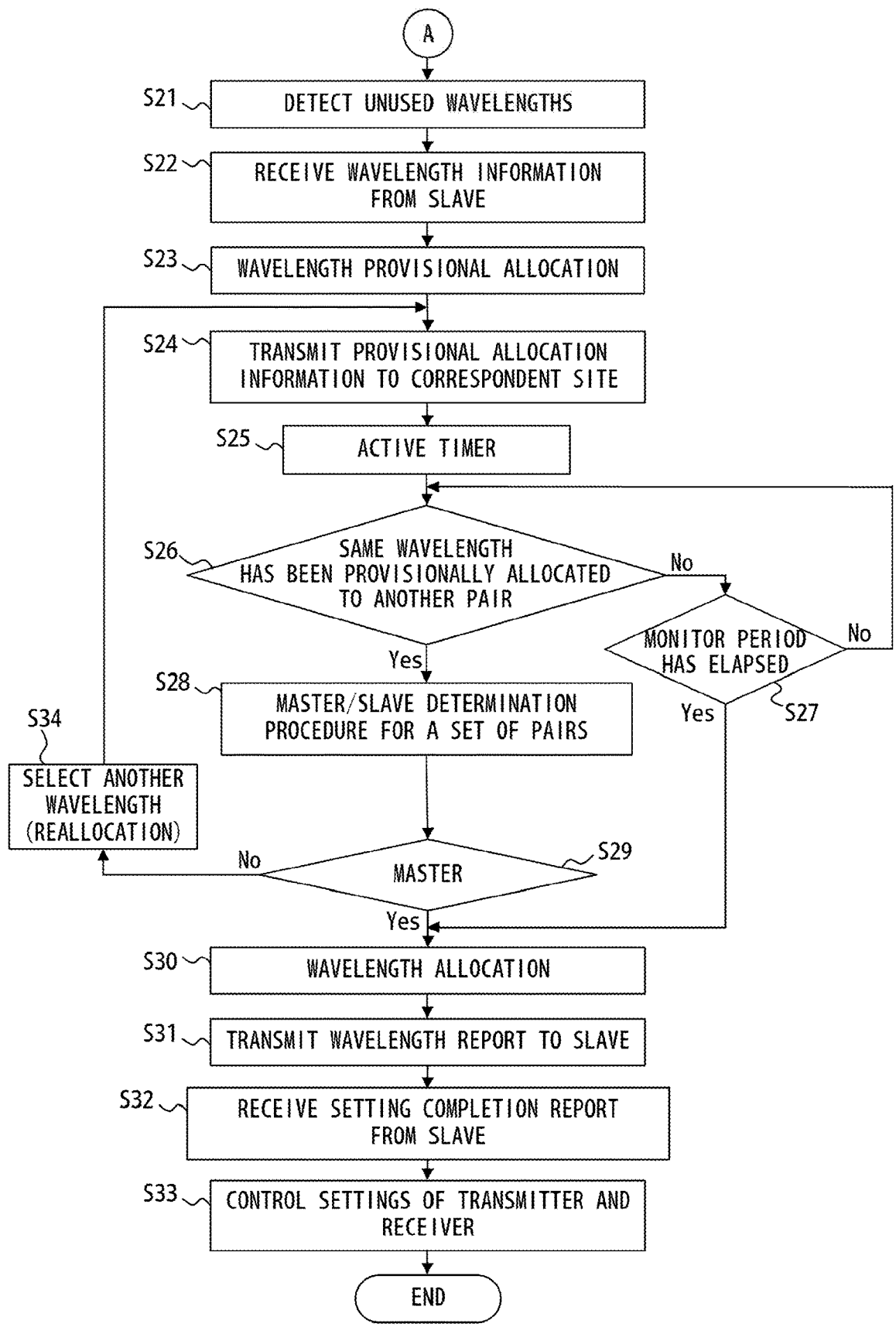

FIGS. 8-9 are flowcharts indicating an example of a process of a transponder. The processes of these flowcharts are performed after, for example, a router is connected to a transponder.

In S1, a transponder receives an OSPF Hello packet from a router. In S2, the ID information obtaining unit 11 obtains an IP address from this packet. The value of a network section of this IP address hereinafter referred to as ID information. The ID information is represented as "ID" in FIG. 8.

In S3, the controller 16 transmits the ID information obtained from the input packet to a correspondent site. In S4, the controller 16 receives ID information from the correspondent site. In S5, the controller 16 decides whether the ID information obtained in S2 matches the ID information received in S4. When these pieces of ID information identical match each other, the controller 16 performs, in S6-S7, a master/slave determination process with a source transponder that is the source of the ID information received in S4.

When it is determined in the master/slave determination procedure that the transponder in which the controller 16 is implemented is to be operated as a master device, the process of the controller 16 shifts to S21. When it is determined that the transponder in which the controller 16 is implemented is to be operated as a slave device, the process of the controller 16 shifts to S11.

S11-S15 are performed when the transponder is operated as a slave device. In S11, the controller 16 detects wavelengths that have not been used in the optical transmission system 100. In S12, the controller 16 transmits wavelength information indicating the detected unused wavelengths to the master device. In S13, the controller 16 receives a wavelength report from the master device. The wavelength report indicates a wavelength allocated to a communication with a correspondent transponder provided at the correspondent site (hereinafter referred to as a selected wavelength).

In S14, the controller 16 controls a circuit within the transponder in accordance with the received wavelength report. In particular, the controller 16 controls settings of the transmitter 13 so as to transmit a client signal using the selected wavelength. The controller 16 also controls settings of the coherent receiver 14 so as to receive an optical signal having the selected wavelength and recover a client signal. In S15, the controller 16 transmits a setting completion report to the master device.

S21-S34 are performed when the transponder is operated as a master device. In S22, the controller 16 selects wavelengths that have not been used in the optical transmission system 100. In S22, the controller 16 receives wavelength information from the slave device. The wavelength information indicates the unused wavelengths detected by the slave device.

In S23, the controller 16 performs a wavelength provisional allocation. In particular, the controller 16 provisionally determines a wavelength to be used to transmit a client signal between the transponder pair from among common wavelengths of the unused wavelengths detected by the controller 16 and the unused wavelengths detected by the slave device.

In S24, the controller 16 transmits provisional allocation information indicating the wavelength provisionally determined in S23 to the correspondent site. In S25, the controller 16 activates a timer.

In S26-S27, the controller 16 waits for provisional allocation information transmitted from the correspondent site. As described above, the provisional allocation information indicates a wavelength provisionally determined so to be allocated to a communication between a transponder pair. The controller 16 performs monitoring as to whether the same wavelength has been selected for another transponder pair.

When the same wavelength has been selected for another transponder pair, the controller 16 performs a master/slave determination procedure for a set of the transponder pairs in S28-S29.

When it is determined in the master/slave determination procedure for a set of the transponder pairs that the transponder in which the controller 16 is implemented is to be operated as a master device for the transponder pairs, the controller 16 allocates, in S30, the wavelength provisionally determined in S23 to a communication between the transponder pair that includes the transponder in which the controller 16 is implemented. In S31, the controller 16 transmits a wavelength report to the slave device. The wavelength report indicates the wavelength allocated to the communication between the transponders in S30 (hereinafter referred to as a selected wavelength). In S32, the controller 16 receives a setting completion report from the slave device. In S33, the controller 16 controls a circuit within the transponder in accordance with the wavelength allocation in S30. In particular, the controller 16 controls settings of the transmitter 13 so as to transmit a client signal using the selected wavelength. The controller 16 also controls settings of the coherent receiver 14 so as to receive an optical signal having the selected wavelength and recover a client signal.

When it is determined in the master/slave determination procedure that the transponder in which the controller 16 is implemented is to be operated as a slave device for the transponder pairs (S29: No), the controller 16 selects, in S34, another wavelength from among the unused wavelength detected in advance. In particular, a new provisional allocation is performed. Then, the process of the controller 16 returns to S24.

In the example described above, the IP address of a router (or a value for identifying a subnet under the router) is used as ID information, but the present invention is not limited to this. For example, a MAC address or device name of a router may be used as ID information. In this case, the MAC address or device name of a router belonging to each subnet is preferably known and registered in advance in each transponder. ID information is extracted from an OSPF Hello packet in the example described above, but the present invention is not limited to this. For example, ID information may be extracted from packets based on a neighbor discovery/neighbor check protocol such as LLDP or PING.

Variation of Transponder

Figure 10:
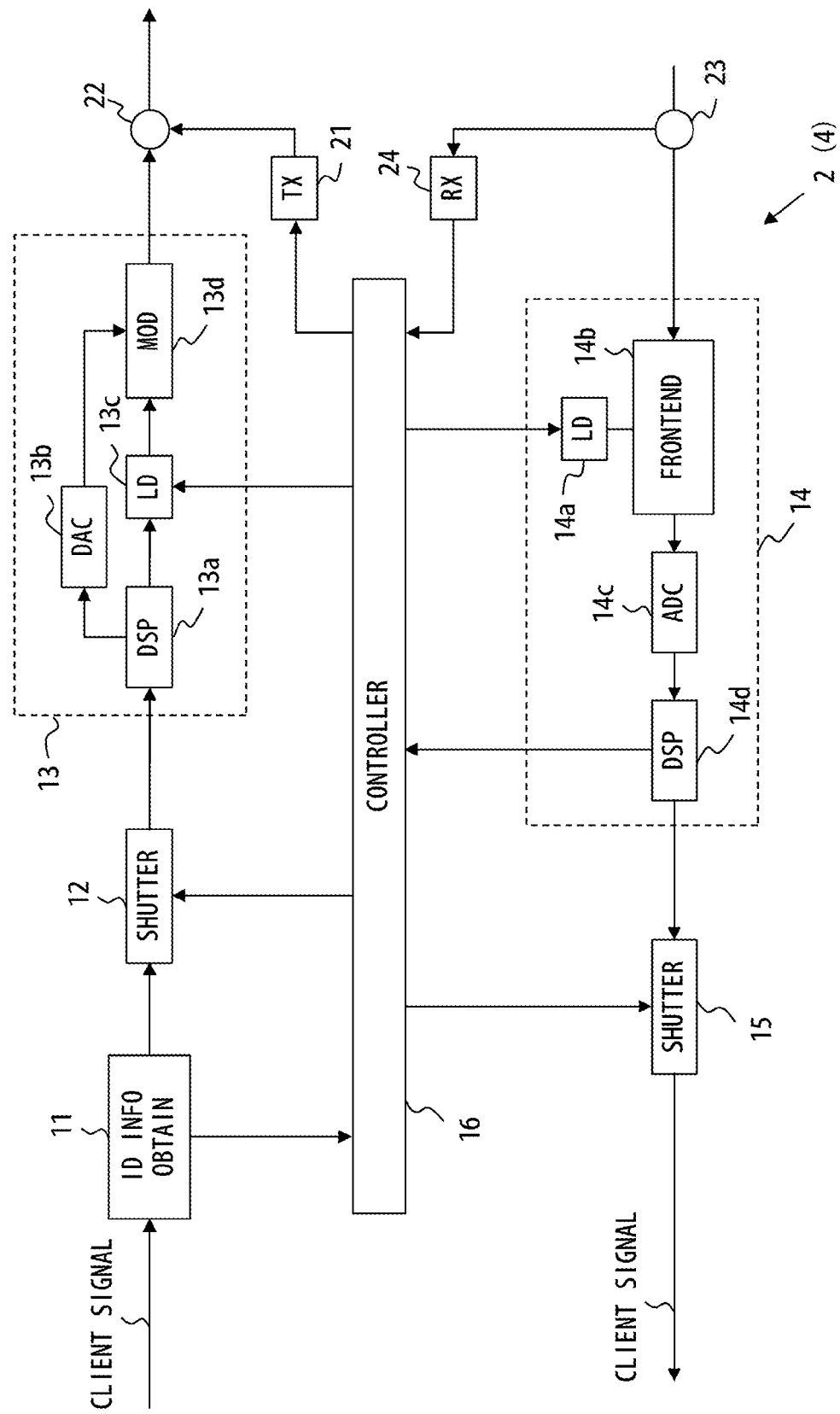
FIG. 10 illustrates an example of a variation of a transponder.

FIG. 10 illustrates an example of a variation of a transponder. In the example depicted in FIG. 3, a control signal is transmitted using one or more channels from among a plurality of wavelength channels multiplexed into a WDM signal. In the example depicted in FIG. 10, by contrast, a wavelength band for transmitting a data signal and a wavelength band for transmitting a control signal are separated from each other.

As depicted in, for example, FIG. 6B, a data signal is transmitted using a 1.5 μm band, and a control signal is transmitted using a 1.3 μm band. In this case, the light source 13c and the local light source 14a each generate continuous wave light of a 1.5 μm band.

The transponder illustrated in FIG. 10 includes a transmission circuit 21, WDM couplers 22 and 23, and a reception circuit 24 in addition to the components depicted in FIG. 3. The transmission circuit 21 includes a light source that generates continuous wave light of a 1.3 μm band so as to generate an optical light for transmitting control information supplied from the controller 16. The optical coupler 22 combines a WDM signal generated by the transmitter 13 and an optical signal generated by the transmission circuit 21. The optical signal obtained from the combining is output to an optical network. The optical coupler 23 separates light of a 1.3 µm band from input light and guides the separated light to the reception circuit 24. The reception circuit 24 recovers control information from the received light of a 1.3 µm band.

In the configuration depicted in FIG. 10, as described above, a control signal is transmitted using a wavelength band that is different from a wavelength band for transmitting a data signal. Accordingly, in comparison with the configuration depicted in FIG. 3, the configuration illustrated in FIG. 10 allows more wavelength channels to be allocated for data transmission, thereby increasing the capacity of WDM signals.

Figure 11:
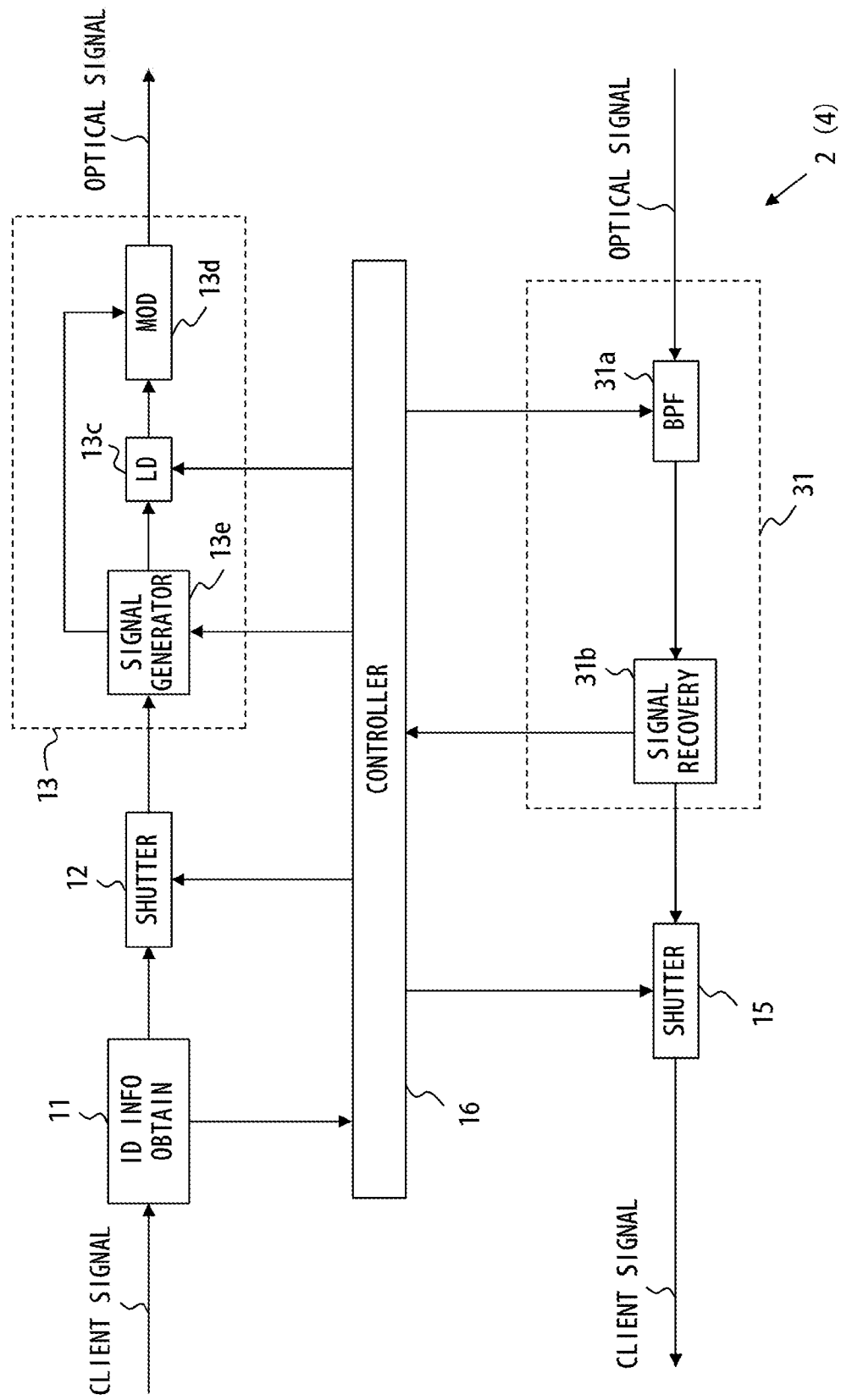
FIG. 11 illustrates another example of a variation of a transponder.

FIG. 11 illustrates another example of the variation of a transponder. This transponder includes a signal generator 13e, instead of the DSP 13a and digital/analog converter 13b depicted in FIGS. 3 and 10. In a wavelength allocation sequence, the signal generator 13e generates a driving signal according to control information supplied from the controller 16. During a data communication, the signal generator 13e generates a driving signal according to a client signal. The modulator 13d generates an optical signal from the driving signal.

A receiver 31 is provided instead of the coherent receiver 14 depicted in FIGS. 3 and 10 and includes a band pass filter (BPF) 31a and a signal recovery 31b. The BPF 31a passes light having a wavelength designated by the controller 16. Accordingly, when the transponder detects unused wavelengths in the wavelength allocation sequence, the BPF 31a scans a passing wavelength in accordance with an instruction from the controller 16. Meanwhile, during a data communication, the BPF 31a passes light having a wavelength selected in the wavelength allocation sequence. The signal recovery 31b recovers a signal from output light of the BPF 31a. The controller 16 may perform the wavelength allocation sequence using the signal recovered by the signal recovery 31b. The controller 16 may decide whether each wavelength has been used according to output signals of the signal recovery 31b.

Variation of Network Configuration

Figure 12:
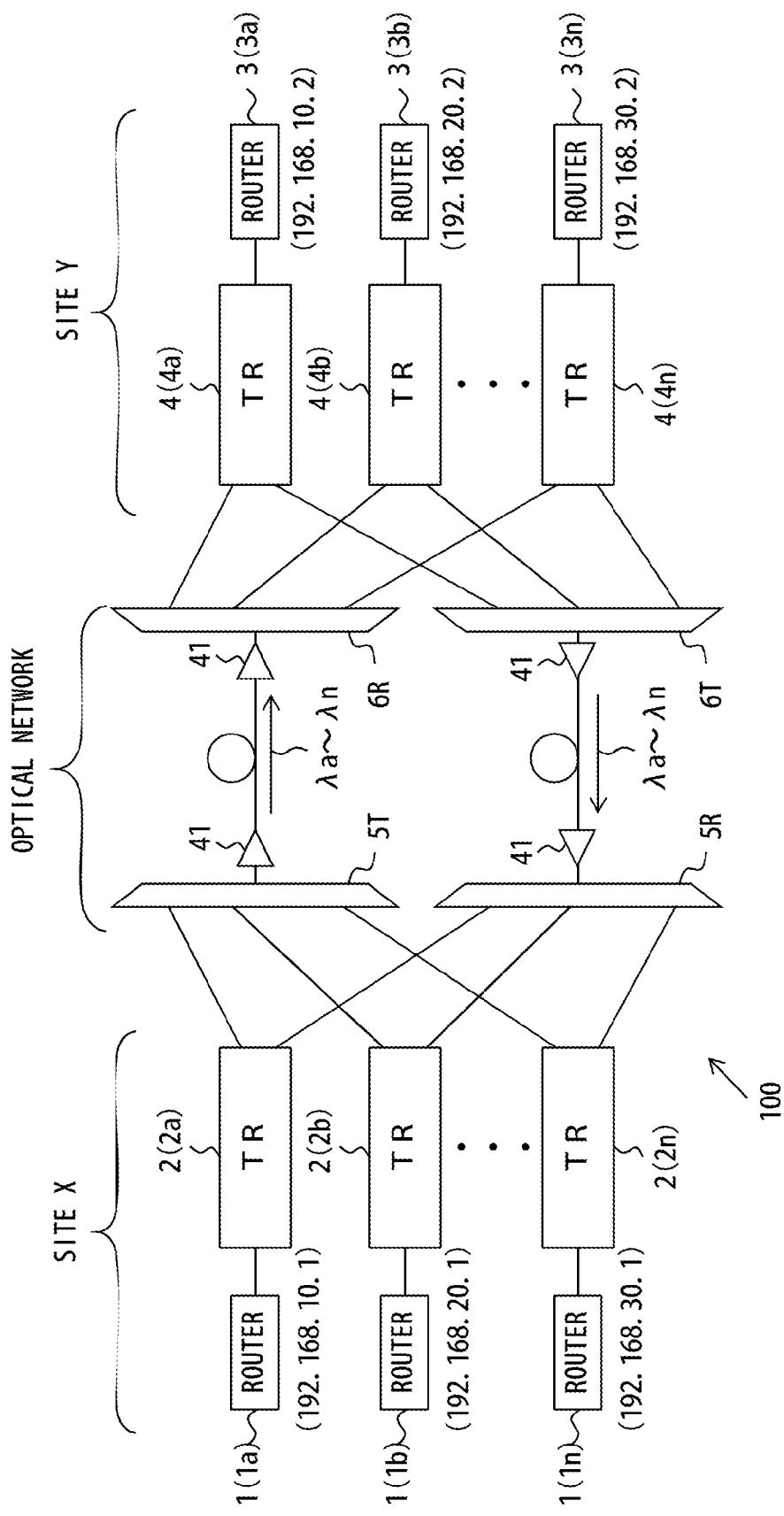
FIGS. 12-17 illustrate examples of variations of a network configuration.

In the example depicted in FIG. 12, optical amplifiers 41 are provided on optical transmission paths between sites X and Y. The optical amplifiers 41 are, for example, erbium-doped fiber amplifiers (EDFAs) and can collectively amplify WDM signals. The optical amplifiers 41 may be provided only on the transmission side, may be provided only on the reception side, or may be provided on both the transmission and reception sides.

A WDM signal transmitted over the optical network is split by the optical couplers at the site on the reception side and distributed to a plurality of transponders. Hence, when the number of splits of the optical coupler is large (i.e., when many transponders are present), the reception power of the WDM signal that arrives at each transponder becomes small. Accordingly, to compensate for a loss of the optical power, the optical amplifiers 41 are implemented. Thus, the number of optical amplifiers 41 provided on the optical transmission path is preferably depends on a transmission distance and the number of splits of the optical couplers.

Figure 13:
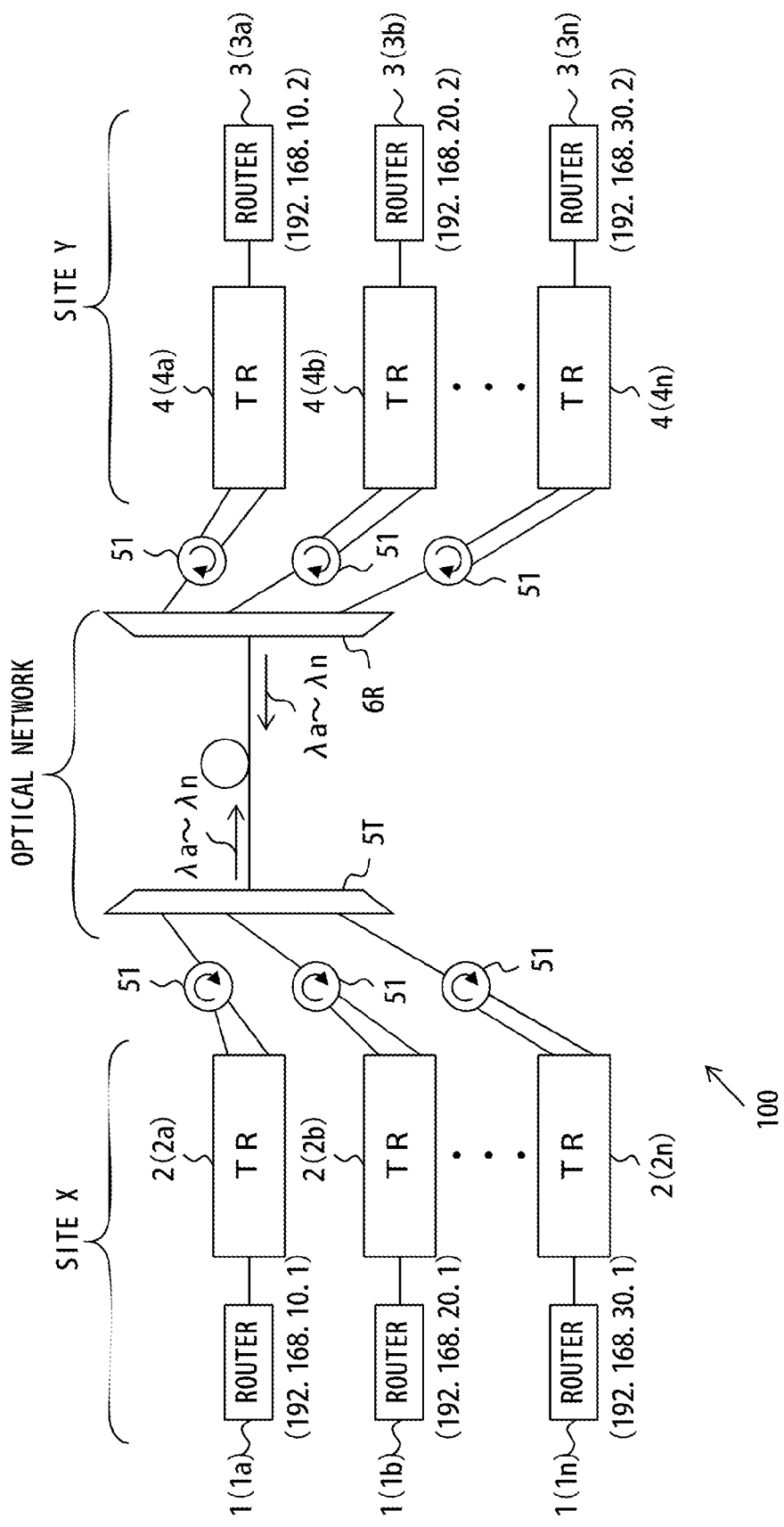

In the example depicted in FIG. 13, an optical circulator 51 is implemented between the transponder and the optical coupler. For example, the optical circulator 51 implemented between the transponder 2a and the optical coupler 5T guides an optical signal output from the transponder 2a to the optical coupler 5T and guides a WDM signal output from the optical coupler 5T to the transponder 2a. According to this configuration, a bidirectional communication is implemented without using an optical coupler for combining a plurality of optical signals (the optical coupler 6T in the example depicted in FIG. 2) and an optical coupler for guiding a WDM signal to a plurality of transponders (the optical coupler 5R in the example depicted in FIG. 2).

When a unidirectional communication, not a bidirectional communication, is performed between sites, the wavelength allocation sequence is simplified. In, for example, selecting a wavelength for transmitting a client signal from the site X to the site Y, the following sequence is performed:

(1) In the site X, the transponder 2a obtains ID information from an OSPF Hello packet received from the router 1a. Then, the transponder 2a transmits the ID information to the site Y via wavelength path λcont. The ID information is received by each of the transponders 4 in the site Y.

(2) In the site Y, each of the transponders 4 obtains ID information from an OSPF Hello packet received from the router 3. When the ID information received from the transponder 2a matches the ID information obtained from the OSPF Hello packet, the transponder 4a selects a wavelength to be used from among unused wavelengths. Then, the transponder 4a transmits wavelength information indicating the selected wavelength to the site X together with the ID information obtained from the OSPF Hello packet. The wavelength information is received by each of the transponders 2 in the site X.

(3) In the transponder 2a, the ID information obtained from the OSPF Hello packet matches the ID information received from the transponder 4a together with the wavelength information. Accordingly, the transponder 2a transmits a client signal to the site Y using the wavelength indicated by the wavelength information received from the transponder 4a.

(4) The transponder 4a configures a receiver in such a manner as to receive an optical signal having the wavelength selected in (2) above. As a result, the setting of the optical path for transmitting a client signal from the transponder 2a to the transponder 4a is completed.

Figure 14:
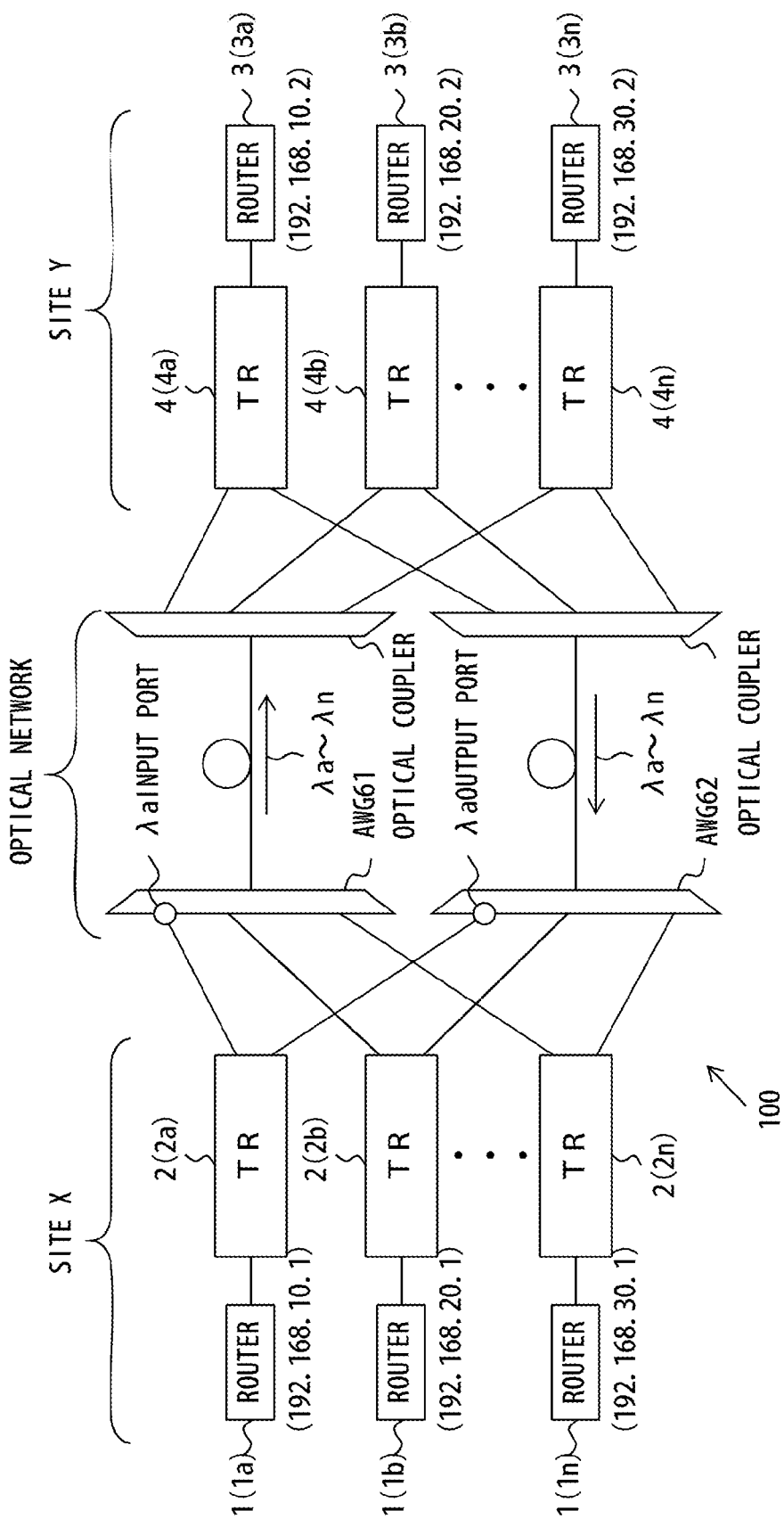

In the example depicted in FIG. 14, AWGs are used, instead of the optical couplers, in either the site X or the site Y. In the example illustrated in FIG. 14, an AWG 61 that combines optical signals output from the transponders 2a-2n and an AWG 62 that divides a WDM signal with respect to wavelengths and guides the divided portions respectively to the transponders 2a-2n are used in the site X. The transponder 2a is connected to a λa input port of the AWG 61 and a λa output port of the AWG 62. In this case, for example, the following wavelength allocation sequence is performed:

(1) In the site X, the transponder 2a obtains ID information from an OSPF Hello packet received from the router 1a. Then, the transponder 2a transmits the ID information to the site Y via wavelength path λa. The ID information is received by each of the transponders 4 in the site Y.

(2) In the site Y, each of the transponders 4 obtains ID information from an OSPF Hello packet received from the router 3. When the ID information received from the transponder 2a matches the ID information obtained from the OSPF Hello packet, the transponder 4a transmits the ID information obtained from the OSPF Hello packet to the site X. In this situation, the transponder 4a has received the ID information from the transponder 2a via wavelength path λa.

Accordingly, the transponder 4a transmits the ID information obtained from the OSPF Hello packet to the site X via wavelength λa.

(3) When ID information that matches the ID information obtained from the OSPF Hello packet is received from the site Y, the transponder 2a transmits a client signal to the site Y via wavelength λa.

(4) When the client signal is received from the site X via wavelength λa, the transponder 4a transmits a client signal to the site X via wavelength λa. As a result, the setting of the optical path between the transponders 2a and 4a is completed.

Figure 15:
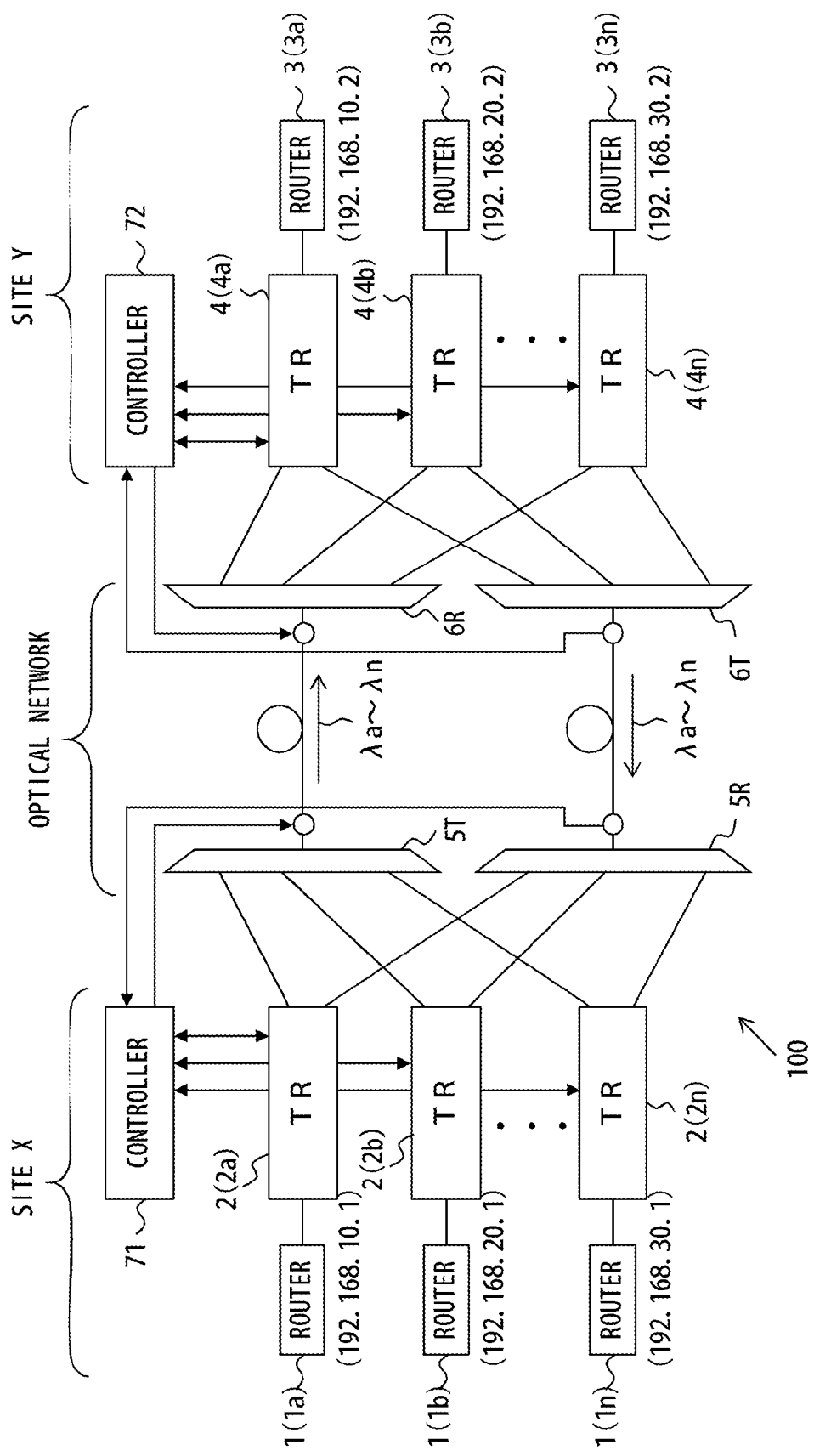

In the example depicted in FIG. 15, the function of the controller 16 indicated in FIG. 2 is implemented by a controller provided outside the transponder. In particular, the function of the controller 16 for each of the transponders 2a-2n is implemented by a controller 71, and the function of the controller 16 for the transponders 4a-4n is implemented by a controller 72. In this case, the transponders 2a-2n and the controller 71 are preferably implemented within the same building or equipment. Similarly, the transponders 4a-4n and the controller 72 are preferably implemented within the same building or equipment. Each of the transponders 2a-2n and 4a-4n is provided with a function to transmit/receive a control signal to/from corresponding controllers 71 and 72. The controllers 71 and 72 may each be shared between a plurality of transponders or may each be provided for one transponder.

In an optical transmission system with the configuration described above, each transponder obtains ID information from an input signal. When, for example, ID information obtained from an input signal by the transponder 2a matches ID information obtained from an input signal by the transponder 4a, the controllers 71 and 72 decide which controllers is to be operated as a master device. The transponders 2a and 4a each detect wavelengths that have not been used in the optical transmission system 100. When the controller 71 is operated as a master device, the controller 71 selects a first wavelength from the unused wavelengths for a communication between the transponders 2a and 4a. When the first wavelength has not been selected for a communication between other optical transmission devices, the controller 71 allocates the first wavelength to the communication between the transponders 2a and 4a.

Figure 16:
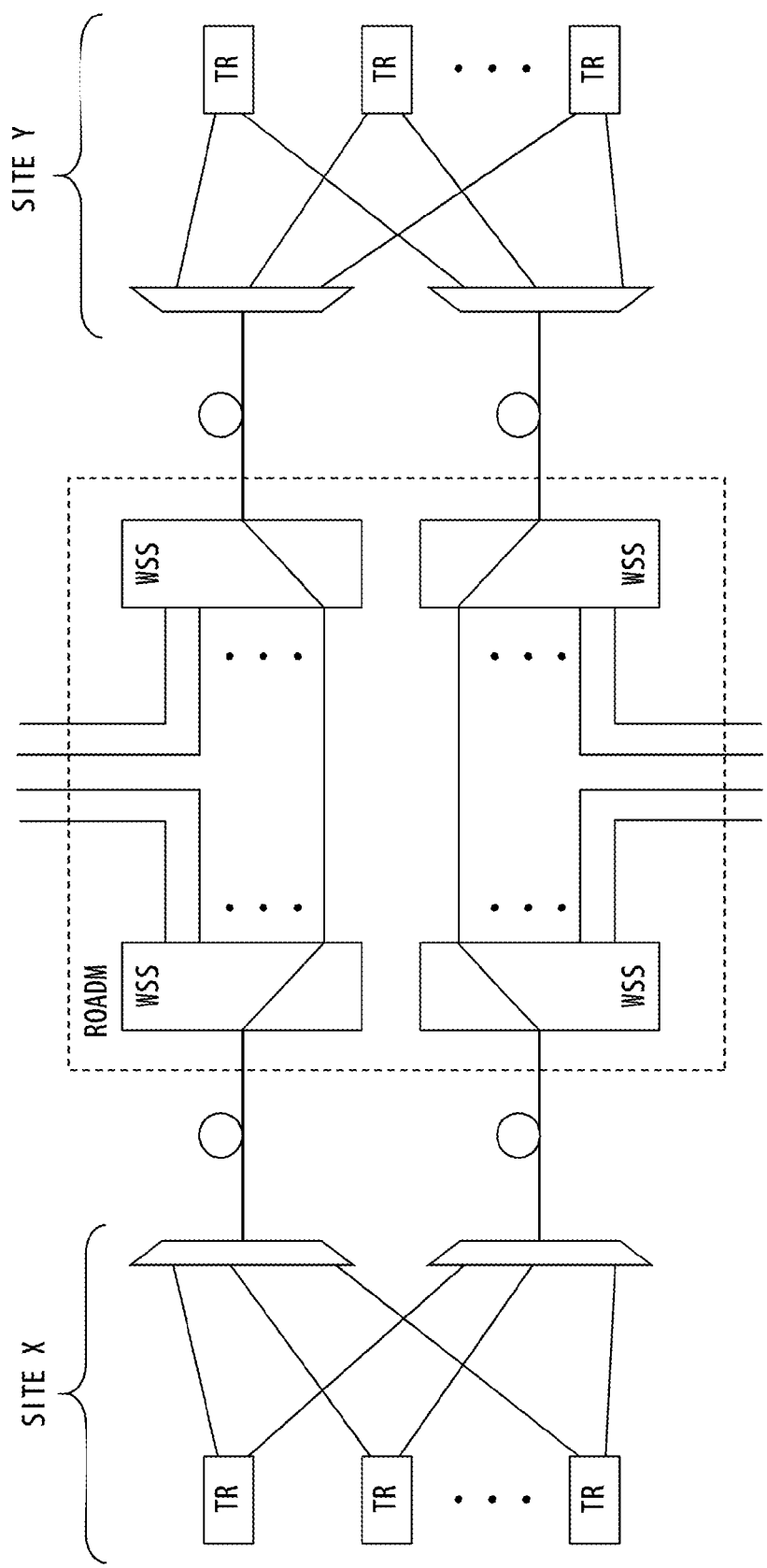

In the example depicted in FIG. 16, a reconfigurable optical add drop multiplexer (ROADM) node is provided between sites X and Y. Wavelength selective switches (WSSs) are implemented in the ROADM node. The wavelength selective switch can guide an optical signal to a desired degree in accordance with its wavelength. However, the wavelength selective switch implemented in the ROADM node provided between the sites X and Y guides all optical signals received from the site X to the site Y and guides all optical signals received from the site Y to the site X.

Figure 17:
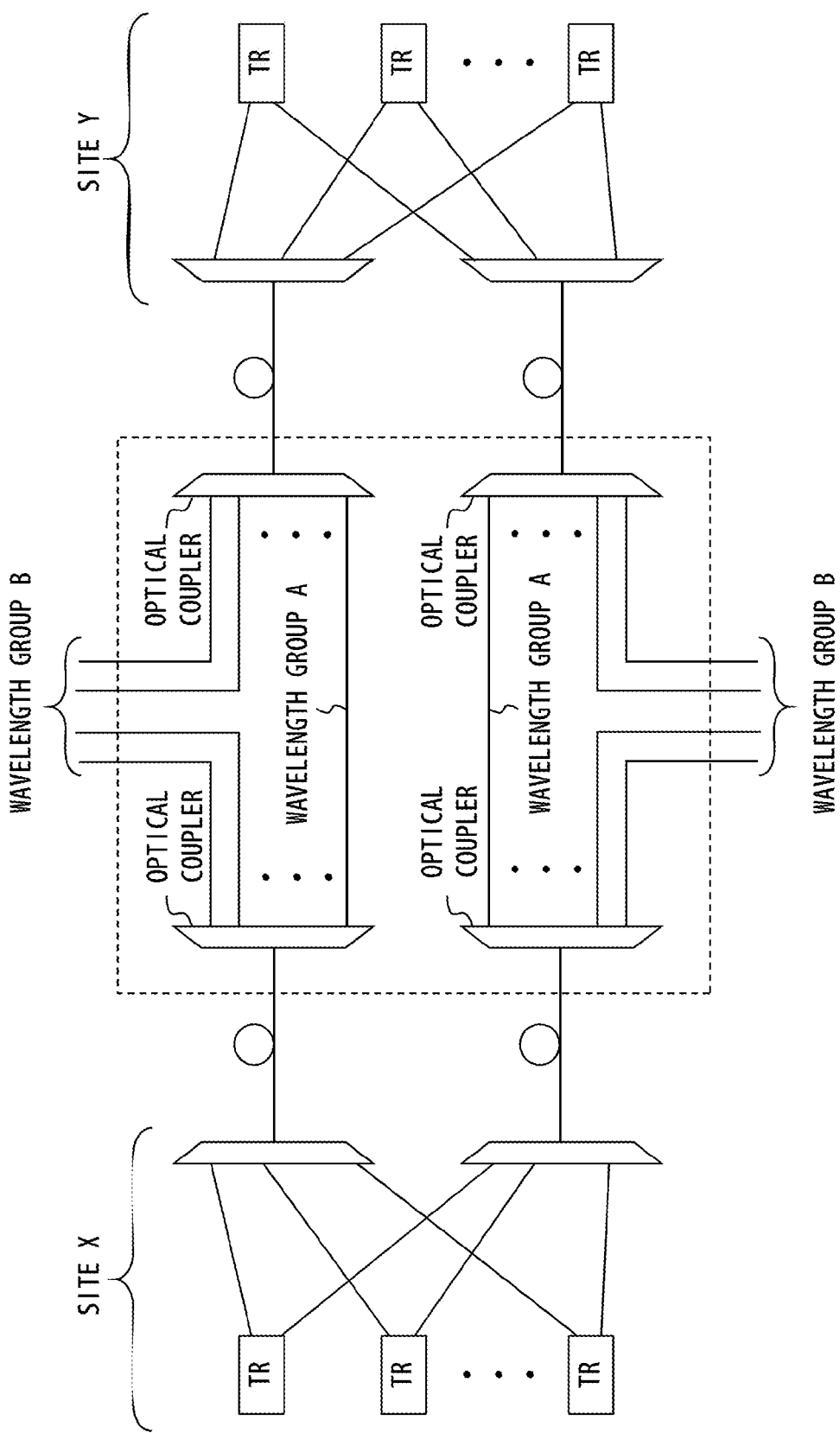

In the example depicted in FIG. 17, a relay node is provided between sites X and Y. Optical couplers for splitting input optical signals are implemented in the relay node. The optical coupler is used as an optical splitter and can split and then guide an input optical signal to one or more degrees. Optical couplers for combining a plurality of optical signals are also implemented in the relay node. The optical coupler can combine optical signals received from the sites X and Y and optical signals received from other nodes.

In the configuration depicted in FIG. 17, wavelengths belonging to a wavelength group A and wavelengths belonging to a wavelength group B are determined in a manner such that the same wavelength does not belong to both the wavelength groups A and B. The wavelength group A includes wavelengths to be allocated to a communication between the sites X and Y. The wavelength group B includes wavelengths to be allocated to a communication between the site X and another node or a communication between the site Y and another node. In the configuration depicted in FIG. 17, an optical signal is split by the optical coupler implemented in the relay node, and this would result in a large optical loss. Accordingly, although not particularly illustrated, an optical amplifier is preferably provided between the site X and the relay node and/or between the site Y and the relay node.

Second Embodiment

In the embodiments depicted in FIGS. 5-9, a dedicated wavelength channel for transmitting a control signal (the ID information, wavelength information, wavelength report, setting completion report, or the like in the example depicted in FIG. 5) is provided. In the example depicted in FIG. 6A, a control signal is transmitted using wavelength λcont. In the embodiments depicted in FIGS. 5-9, a procedure for determining a wavelength for a pair of a master device and a slave device is performed. Accordingly, it could take a long time to determine a wavelength. In, for example, a case where many transponders are connected to a network, adjustments need to be performed between master devices, and hence it will take a long time to determine a wavelength. These problems will be solved or eased in the embodiments described hereinafter.

Figure 18:
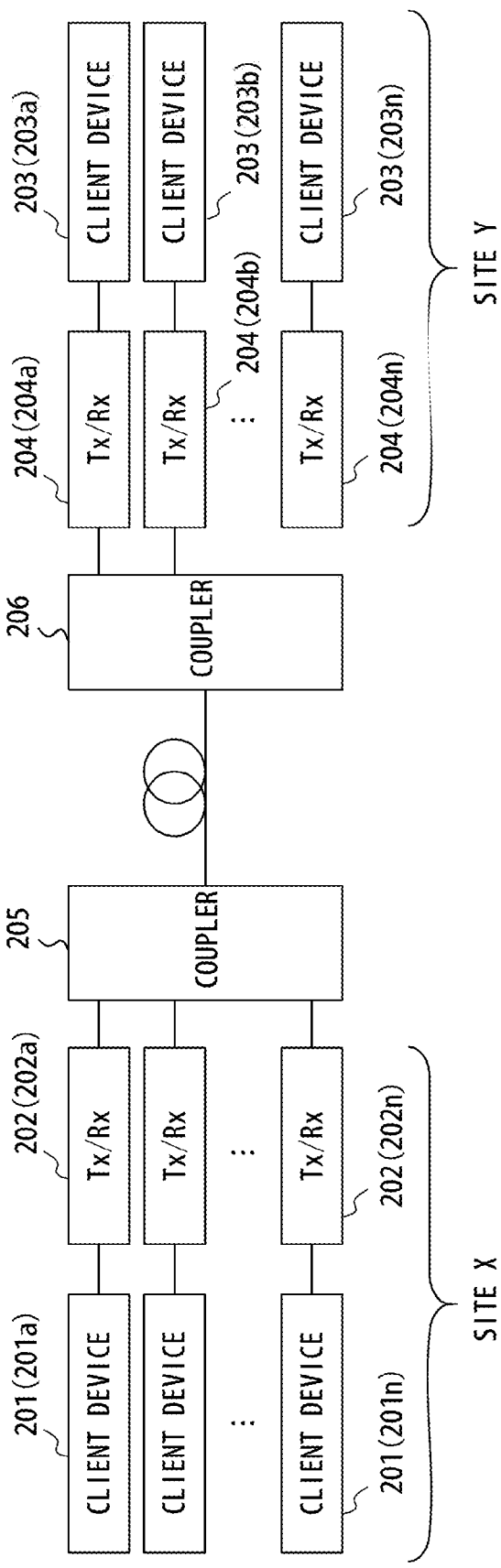
FIG. 18 illustrates an example of an optical transmission system in accordance with a second embodiment.

FIG. 18 illustrates an example of an optical transmission system in accordance with a second embodiment of the present invention. As in the first embodiment, a WDM signal is transmitted between sites X and Y in an optical transmission system of the second embodiment.

The site X is provided with a plurality of client devices 201 (201a-201n) and a plurality of optical transceivers 202 (202a-202n). The site Y is provided with a plurality of client devices 203 (203a-203n) and a plurality of optical transceivers 204 (204a-204n). Each of the client devices 201 and 203 is, for example, a layer 3 device. The client devices 201 and 203 correspond to the routers 1 and 3 depicted in FIG. 2, and the optical transceivers 202 and 204 correspond to the transponders 2 and 4 depicted in FIG. 2.

The optical transceiver 202 transmits a client signal input from a corresponding client device 201 to the site Y and outputs a client signal received from the site Y to the corresponding client device 201. Similarly, the optical transceiver 204 transmits a client signal input from a corresponding client device 203 to the site X and outputs a client signal received from the site X to the corresponding client device 203.

The optical transceivers 202a-202n transmit client signals to the site Y using different wavelengths. Similarly, the optical transceivers 204a-204n transmit client signals to the site X using different wavelengths.

An optical coupler 205 generates a WDM signal by combining optical signals λa-λn output from the optical transceivers 202a-202n. The WDM signal generated by the optical coupler 205 is transmitted to the site Y over the optical network. An optical coupler 206 divides and then guides the WDM signal received from the site X to the optical transceivers 204a-204n. Accordingly, the optical coupler 206 functions as an optical splitter, and the same WDM signal is guided to the optical transceivers 204a-204n.

The optical coupler 206 generates a WDM signal by combining optical signals λa-λn output from the optical transceivers 204a-204n. The WDM signal generated by the optical coupler 206 is transmitted to the site X over the optical network. The optical coupler 205 divides and then guides the WDM signal received from the site Y to the optical transceivers 202a-202n. Accordingly, the optical coupler 205 functions as an optical splitter, and the same WDM signal is guided to the optical transceivers 202a-202n.

In an optical transmission system with the configuration described above, each of the optical transceivers 202a-202n and 204a-204n includes a function to select a wavelength that has not been used in the optical transmission system. Each of the optical transceivers 202a-202n and 204a-204n transmits a client signal to a correspondent site using the selected wavelength. Each of the optical transceivers 202a-202n and 204a-204n extracts an optical signal of the selected wavelength from a WDM signal received from the correspondent site. Accordingly, a point-to-point WDM network is established.

FIG. 19 illustrates the outline of a wavelength selection sequence in accordance with the second embodiment. In this example, in the site X, the optical transceiver 202a obtains ID information of the client device 201a. In the site Y, the optical transceiver 204a obtains ID information of the client device 203a, and the optical transceiver 204b obtains ID information of the client device 203b.

As in the first embodiment, each of the client devices 201 and 203 periodically transmits a neighbor discovery packet (e.g., OSPF Hello). The neighbor discovery packet includes the IP address of the source client device. Each of the optical transceivers 202 and 204 obtains, as ID information, the value of a network section of the IP address of the source of the neighbor discovery packet. The value of the network section of the IP address identifies a subnet. Thus, each of the optical transceivers 202 and 204 obtains ID information for identifying a subnet to which the optical transceiver is connected.

Assume that the optical transceivers 202a and 204a are connected to a subnet a and that the optical transceiver 204b is connected to a subnet b. In this case, the optical transceivers 202a and 204a each obtain "ID_a" for identifying the subnet a as ID information. The optical transceiver 204b obtains "ID_b" for identifying the subnet b as ID information.

The optical transceiver 202a transmits ID information ID_a to the site Y. In particular, the optical transceiver 202a selects an unused wavelength channel from wavelength channels provided for data communications and transmits ID information ID_a to the site Y using the selected wavelength channel. In FIG. 19, ID information ID_a is transmitted from the optical transceiver 202a to the site Y using wavelength channel λ1. An optical signal of wavelength channel λ1, together with optical signals of other wavelength channels, is multiplexed into a WDM signal. The WDM signal is transmitted from the site X to the site Y, where this WDM signal is divided by the optical coupler 206 and then guided to the optical transceivers 204a-204n.

In the site Y, each of optical transceivers 204 that are not performing a data communication waits for ID information transmitted from the site X while sequentially selecting the wavelength channels of the WDM signal one by one. In this example, accordingly, when wavelength channel λ1 is selected, each of optical transceivers 204 that are not performing a data communication receives the ID information transmitted from the optical transceiver 202a.

Then, the optical transceiver 204 compares the ID information received from the site X with ID information obtained from a corresponding client device 203. In this example, the optical transceiver 204a obtains ID information ID_a from the client device 203a. Thus, the ID information received by the optical transceiver 204a from the site X matches the ID information obtained by the optical transceiver 204a from the client device 203a. In this case, the optical transceiver 204a decides that the data communication with the site X can be performed via the wavelength channel through which the same ID information as the ID information obtained in the optical transceiver 204a was transmitted (i.e., wavelength channel λ1). Accordingly, the optical transceiver 204a transmits the ID information thereof (i.e., ID_a obtained from the client device 203a) to the site X via wavelength channel λ1.

An optical signal of wavelength channel λ1, together with optical signals of other wavelength channels, is multiplexed into a WDM signal. The WDM signal is transmitted from the site Y to the site X, where this WDM signal is divided by the optical coupler 205 and then guided to the optical transceivers 202a-202n.

The optical transceiver 202a transmits ID information thereof to the site Y using wavelength channel λ1. In this case, the optical transceiver 202a waits for ID information transmitted from the site Y using wavelength channel λ1. Hence, the optical transceiver 202a receives ID information transmitted from the optical transceiver 204a. The ID information obtained by the optical transceiver 202a from the client device 201a matches the ID information received by the optical transceiver 202a from the site Y. In this case, the optical transceiver 202a decides that the data communication with the site Y can be performed via the wavelength channel through which the same ID information as the ID information obtained in the optical transceiver 202a was transmitted (i.e., wavelength channel λ1).

The optical transceiver 204b has obtained ID information ID_b from the client device 203b. Thus, the ID information received by the optical transceiver 204b from the site X is different from the ID information obtained by the optical transceiver 204b from the client device 203b. In this case, the optical transceiver 204b does not transmit an optical signal to the site X.

Through the sequence described above, the optical transceiver 202a selects λ1 as a wavelength channel to be used for a communication with the site Y, and the optical transceiver 204a selects λ1 as a wavelength channel to be used for a communication with the site X. After this, accordingly, data is transmitted bidirectionally between the optical transceivers 202a and 204a via wavelength channel λ1.

In the wavelength selection sequence in accordance with the second embodiment, as described above, one of the wavelength channels provided for data communications is used to transmit control information for wavelength selection. Hence, a dedicated wavelength channel for transmitting control information does not need to be provided, thereby enhancing the efficiency of wavelength usage for WDM transmissions. In the sequence in accordance with the second embodiment, no adjustments are performed between a master and a slave or between a master and a master, and hence it will take only a short time to perform the process of determining a wavelength channel for a data communication.

Figure 20:
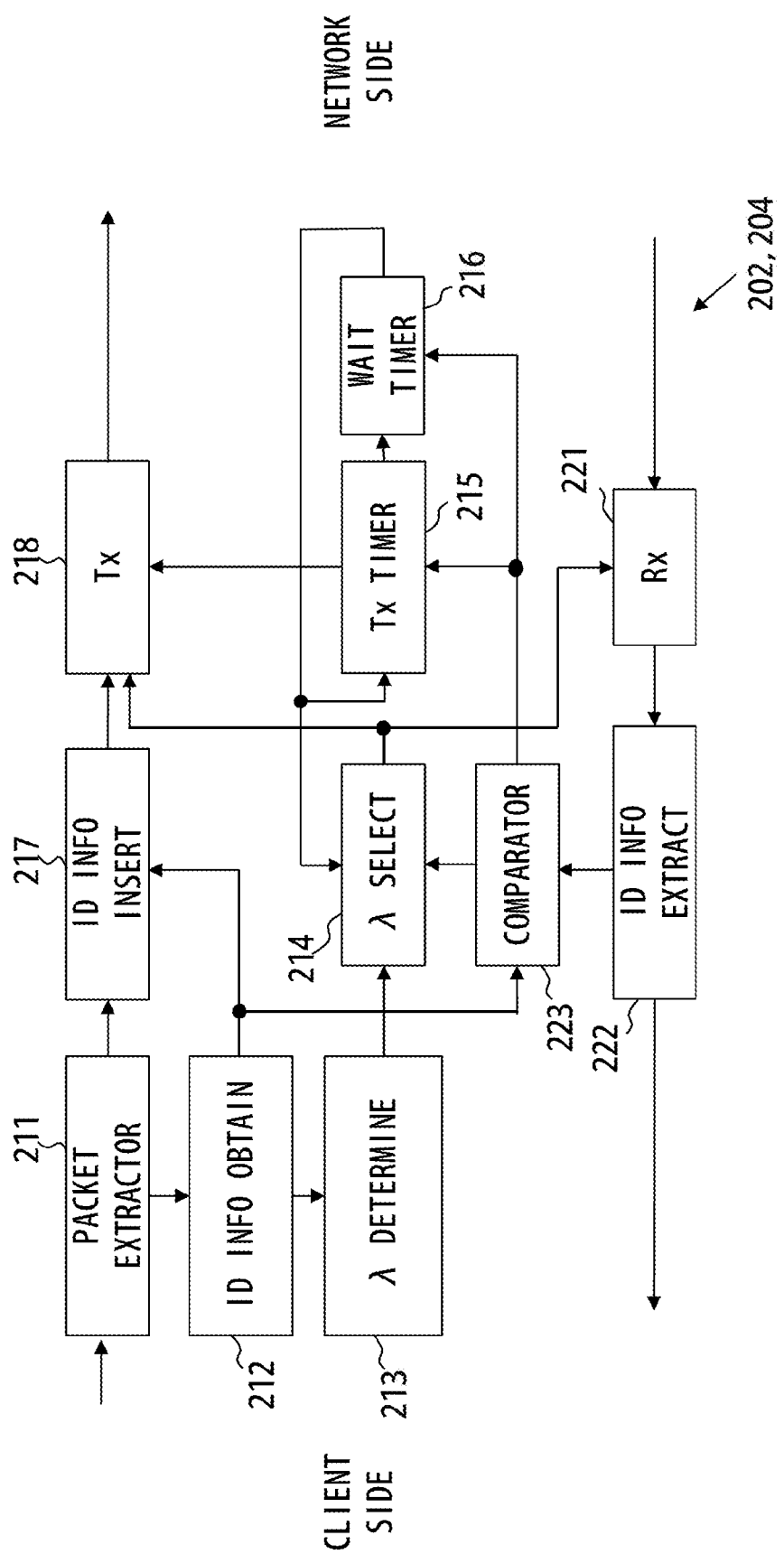
FIG. 20 illustrates an example of an optical transceiver.

FIG. 20 illustrates an example of the optical transceiver 202. The optical transceiver 202 and the optical transceiver 204 are almost identical with each other. Accordingly, descriptions of the optical transceiver 204 are omitted herein.

The optical transceiver 202 includes a packet extractor 211, an ID information obtaining unit 212, an available wavelength determination unit 213, a wavelength selector 214, a transmission timer 215, a waiting timer 216, an ID information inserter 217, an optical transmitter 218, an optical receiver 221, an ID information extraction unit 222, and a comparator 223. The optical transceiver 202 may include circuits or functions that are not depicted in FIG. 20.

The packet extractor 211 extracts a neighbor discovery packet from an output signal of a client device 201 and guides the extracted packet to the ID information obtaining unit 212. The neighbor discovery packet is, for example, an OSPF Hello packet of RFC 2328 and is periodically transmitted from the client device 201. The ID information obtaining unit 212 extracts a source IP address of the neighbor discovery packet. The ID information obtaining unit 212 obtains the value of a network section of the source IP address as ID information. The ID information obtaining unit 212 saves the obtained ID information.

According to the ID information obtained by the ID information obtaining unit 212, the available wavelength determination unit 213 determines wavelength channels (i.e., candidate wavelength channels to be used by the optical transceiver 202) that can be used by the optical transceiver 202. The wavelength selector 214 selects a wavelength channel to be used by the optical transceiver 202 from among the available wavelength channels determined by the available wavelength determination unit 213.

The transmission timer 215 measures a period in which the optical transceiver 202 transmits optical signals in a wavelength selection sequence. The waiting timer 216 measures a period in which the optical transceiver 202 waits for optical signals transmitted from a correspondent site without transmitting an optical signal in the wavelength selection sequence. In the wavelength selection sequence, the ID information inserter 217 obtains the ID information saved by the ID information obtaining unit 212 and inserts the ID information into a signal to be transmitted to a correspondent site.

The optical transmitter 218 generates an optical signal. The configuration of the optical transmitter 218 is the same as, for example, the transmitter 13 depicted in FIG. 3. Thus, the optical transmitter 218 includes a wavelength tunable light source and can generate an optical signal of a designated wavelength. In particular, the optical transmitter 218 transmits an optical signal using a wavelength channel selected by the wavelength selector 214. The optical signal generated by the optical transmitter 218 is multiplexed into a WDM signal together with other optical signals.

The optical receiver 221 receives an optical signal of a designated wavelength from among a plurality of optical signals multiplexed into an input WDM signal. The configuration of the optical receiver 221 is the same as, for example, the coherent receiver 14 depicted in FIG. 3. The optical receiver 221 receives an optical signal via the wavelength channel selected by the wavelength selector 214.

The ID information extraction unit 222 extracts ID information from the optical signal received by the optical receiver 221. The comparator 223 compares the ID information saved by the ID information obtaining unit 212 with the ID information extracted by the ID information extraction unit 222. That is, the optical transceiver 202 compares ID information thereof with ID information received from the correspondent site.

The functions of the optical transceivers 202 and 204 are implemented by, for example, a processor system that includes a processor and a memory. The processor provides the functions of the optical transceivers 202 and 204 by executing a program stored in the memory. However, some of the functions of the optical transceivers 202 and 204 may be implemented by a hardware circuit.

Figure 21:
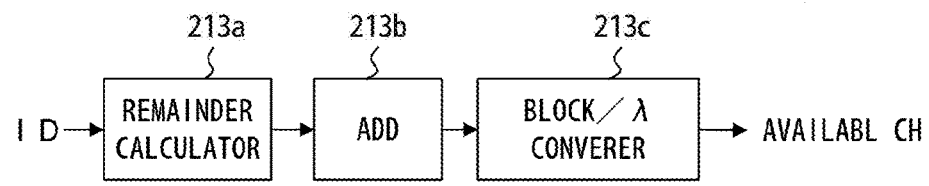
FIGS. 21A-21C illustrate an example of an available wavelength determination unit.

FIGS. 21A-21C illustrate an example of the available wavelength determination unit 213. In this example, an optical transmission system can use 12 wavelength channels (ch1-ch12) to perform data communications. The 12 wavelength channels are divided into four wavelength blocks (#1-#4). In this case, each of the wavelength blocks includes three available wavelength channels.

As depicted in FIG. 21A, the available wavelength determination unit 213 includes a remainder calculator 213a, an adder 213b, and a block_wavelength converter 213c. ID information obtained by the ID information obtaining unit 212 is supplied to the available wavelength determination unit 213. ID information indicates the value of a network section of an IP address of a client device, as described above.

The remainder calculator 213a divides the ID information by the number of wavelength blocks. The adder 213b adds "1" to a remainder that is a result of the division performed by the remainder calculator 213a. The value of a result of the addition indicates a wavelength block that corresponds to the ID information. When, for example, a remainder obtained by diving ID information by "4" is "zero", an output value of the adder 213b is "1". In this case, wavelength block #1 is specified for the ID information.

As depicted in FIG. 21B, the block_wavelength converter 213c includes a table indicating relations between wavelength blocks and available wavelength channels. The block_wavelength converter 213c determines available wavelength channels that correspond to a wavelength block specified by the remainder calculator 213a and the adder 213b.

FIG. 21C depicts an example of a result of allocation performed by the available wavelength determination unit 213. In this example, wavelength channels ch1, ch2, and ch3 belong to wavelength block #1; wavelength channels ch4, ch5, and ch6 belong to wavelength block #2; wavelength channels ch7, ch8, and ch9 belong to wavelength block #3; wavelength channels ch10, ch11, and ch12 belong to wavelength block #4. In this case, when, for example, ID information "11.12.12" is given, a remainder of "zero" is obtained, and a result of addition of "1" is obtained. Accordingly, wavelength block #1 is specified. The available wavelength determination unit 213 outputs information indicting available wavelength channels (i.e., candidate wavelength channels to be used by the optical transceiver 202) for the given ID information. When, for example, optical transceiver #3 obtains ID information "11.12.12", ch1, ch2, and ch3 are determined as available channels.

Figure 22:
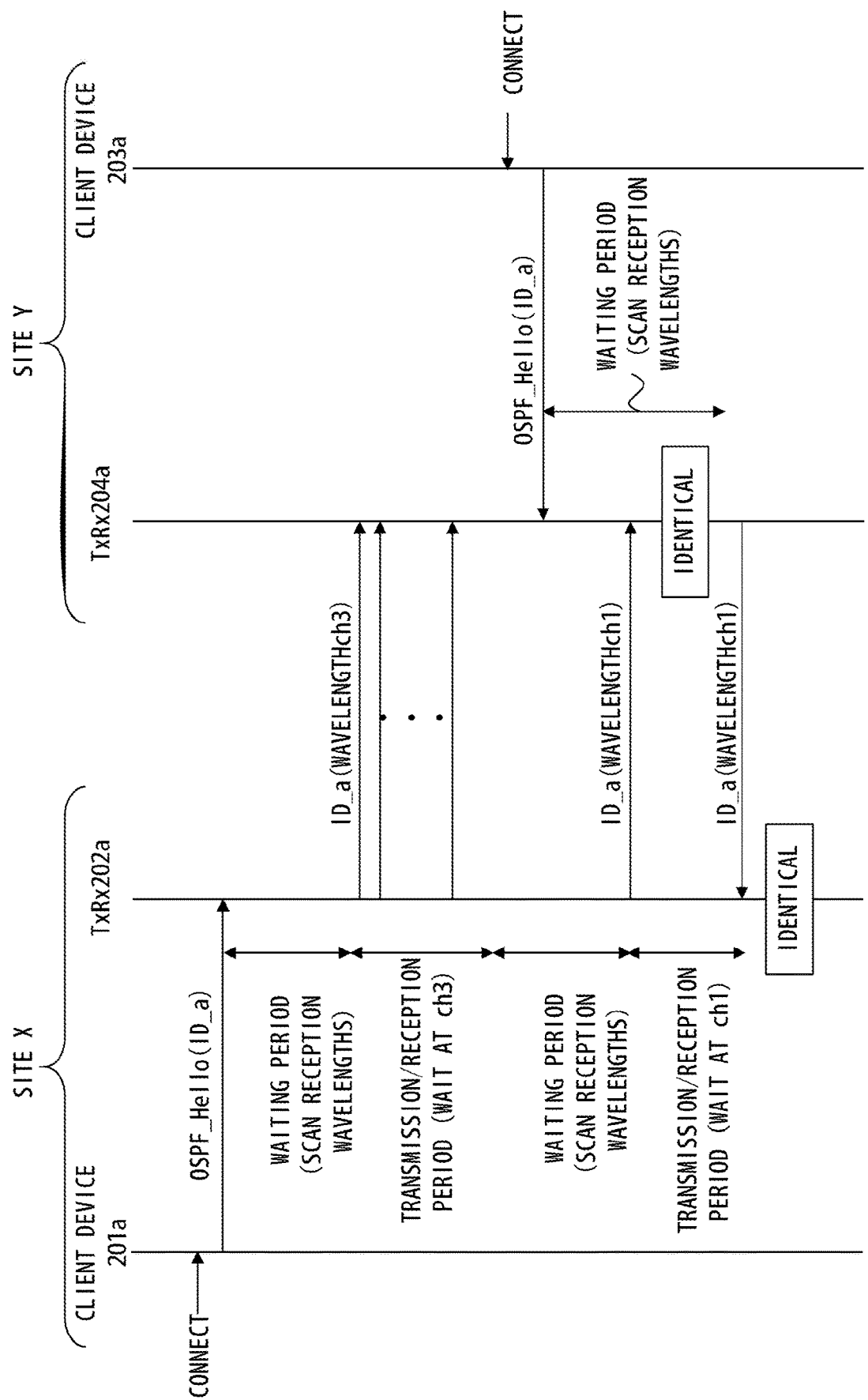
FIG. 22 illustrates an example of a wavelength selection sequence in accordance with a second embodiment.

FIG. 22 illustrates an example of a wavelength selection sequence in accordance with the second embodiment. In this example, a wavelength channel for performing a data communication between the client devices 201a and 203a is selected. The client devices 201a and 203a are connected to the same subnet (a subnetwork identified as ID_a). In FIG. 22, optical transceivers are represented as "TxRx".

In the site X, the client device 201a is connected to the optical transceiver 202a. The client device 201a transmits a neighbor discover packet (OSPF Hello). The optical transceiver 202a obtains ID information ID_a from the neighbor discovery packet. The optical transceiver 202a selects a wavelength block that corresponds to the obtained ID information ID_a and specifies available wavelength channels belonging to the wavelength block. Note that ID information that an optical transceiver obtains from a corresponding client device is saved in this optical transceiver. Accordingly, ID information that an optical transceiver obtains from a corresponding client device may hereinafter be referred to as "own ID information".

Upon receipt of ID information ID_a from the client device 201a, the optical transceiver 202a performs a waiting process. In the waiting process, the optical transceiver 202a waits for optical signals transmitted from the site Y while sequentially selecting reception wavelengths one by one without transmitting an optical signal to the site Y. In this case, the optical transceiver 202a may scan all wavelength channels or may scan only wavelength channels belonging to the selected wavelength block. The waiting timer 216 counts a period in which the waiting process is performed. In this example, the optical transceiver 202a does not receive an optical signal from the site Y during the waiting period.

When the waiting period has ended, the optical transceiver 202a performs a transmission/reception process. In the transmission/reception process, the optical transceiver 202a selects an unused wavelength channel from among the wavelength channels belonging to the selected wavelength channel. In this example, wavelength channel ch3 is selected. Using the selected wavelength channel, the optical transceiver 202a transmits own ID information (i.e., ID information obtained from the client device 201a) to the site Y. Thus, ID information ID_a is transmitted via wavelength channel ch3. In the transmission/reception process, the optical transceiver 202a transmits ID information repeatedly at specified time intervals. The transmission timer 215 counts a period in which the transmission/reception process is performed.

In the transmission/reception process, the optical transceiver 202a waits for an optical signal transmitted from the site Y using a selected wavelength channel. In particular, the optical transceiver 202a waits for an optical signal transmitted from the site Y using the same wavelength channel as a wavelength channel via which ID information is transmitted from the optical transceiver 202a. In this example, the optical transceiver 202a transmits ID information to the site Y using wavelength channel ch3 and waits for an optical signal transmitted from the site Y using wavelength channel ch3. However, assume that the optical transceiver 202a does not receive an optical signal using wavelength channel ch3. When the transmission/reception period has been ended, the optical transceiver 202a performs the waiting process again.

In the site Y, the client device 203a is connected to the optical transceiver 204a. The client device 203a transmits a neighbor discovery packet. The optical transceiver 204a obtains ID information ID_a from the neighbor discovery packet. The optical transceiver 204a selects a wavelength block that corresponds to the obtained ID information ID_a and specifies available wavelength channels belonging to the wavelength block. In this example, the optical transceivers 202a and 204a obtain identical ID information. Hence, the optical transceivers 202a and 204a select an identical wavelength block. Thus, identical available wavelength channels are determined for the optical transceivers 202a and 204a.

When the optical transceiver 204a obtains ID information ID_a from the client device 203a, the optical transceiver 204a performs the waiting process. In the waiting process, without transmitting an optical signal to the site X, the optical transceiver 204a waits for an optical signal transmitted from the site X while sequentially selecting reception wavelengths one by one. In this case, the optical transceiver 204a may scan all wavelength channels or may scan only wavelength channels belonging to the selected wavelength block.

In the site X, when the waiting period is ended, the optical transceiver 202a performs the transmission/reception process again. In this process, the optical transceiver 202a selects another unused wavelength channel from among the wavelength channels belonging to the selected wavelength block. In this example, wavelength channel ch1 is selected. The optical transceiver 202a transmits own ID information to the site Y using the selected wavelength channel. Thus, ID information ID_a is transmitted via wavelength channel ch1.

In the site Y, the optical transceiver 204a waits for an optical signal transmitted from the site X while sequentially selecting reception wavelengths one by one. Accordingly, the optical transceiver 204a receives the ID information ID_a transmitted from the optical transceiver 202a via wavelength channel ch1. Then, the optical transceiver 204a compares the ID information received from the optical transceiver 202a with own ID information (i.e., ID information obtained from the client device 203a). In this example, the received ID information matches the own ID information. In this case, the optical transceiver 204a selects, as a wavelength channel to be used for the data communication, the wavelength channel via which the same ID information as the own ID information has been received. In particular, wavelength channel ch1 is selected as a wavelength channel to be used for the data communication. Subsequently, the optical transceiver 204a transmits own ID information to the site X using the selected wavelength channel ch1.

The optical transceiver 204a transmits ID information while the optical transceiver 202a is performing the transmission/reception process. In this case, the optical transceiver 202a waits for an optical signal transmitted using wavelength channel ch1 from the site Y. Hence, the optical transceiver 202a can receive ID information transmitted via wavelength channel ch1 from the optical transceiver 204a. Then, the optical transceiver 202a compares the ID information received from the optical transceiver 204a with own ID information (i.e., ID information obtained from the client device 201a). In this example, the received ID information matches the own ID information. In this case, the optical transceiver 202a selects, as a wavelength channel to be used for the data communication, the wavelength channel via which the same ID information as the own ID information has been received. In particular, wavelength channel ch1 is selected as a wavelength channel to be used for the data communication.

Subsequently, the optical transceiver 202a transmits a client signal to the site Y using wavelength channel ch1 and receives a client signal from the site Y via wavelength channel ch1. The optical transceiver 204a transmits a client signal to the site X using wavelength channel ch1 and receives a client signal from the site X via wavelength channel ch1. That is to say, the client devices 201a and 203a perform a bidirectional data communication using wavelength channel ch1.

Figure 23:
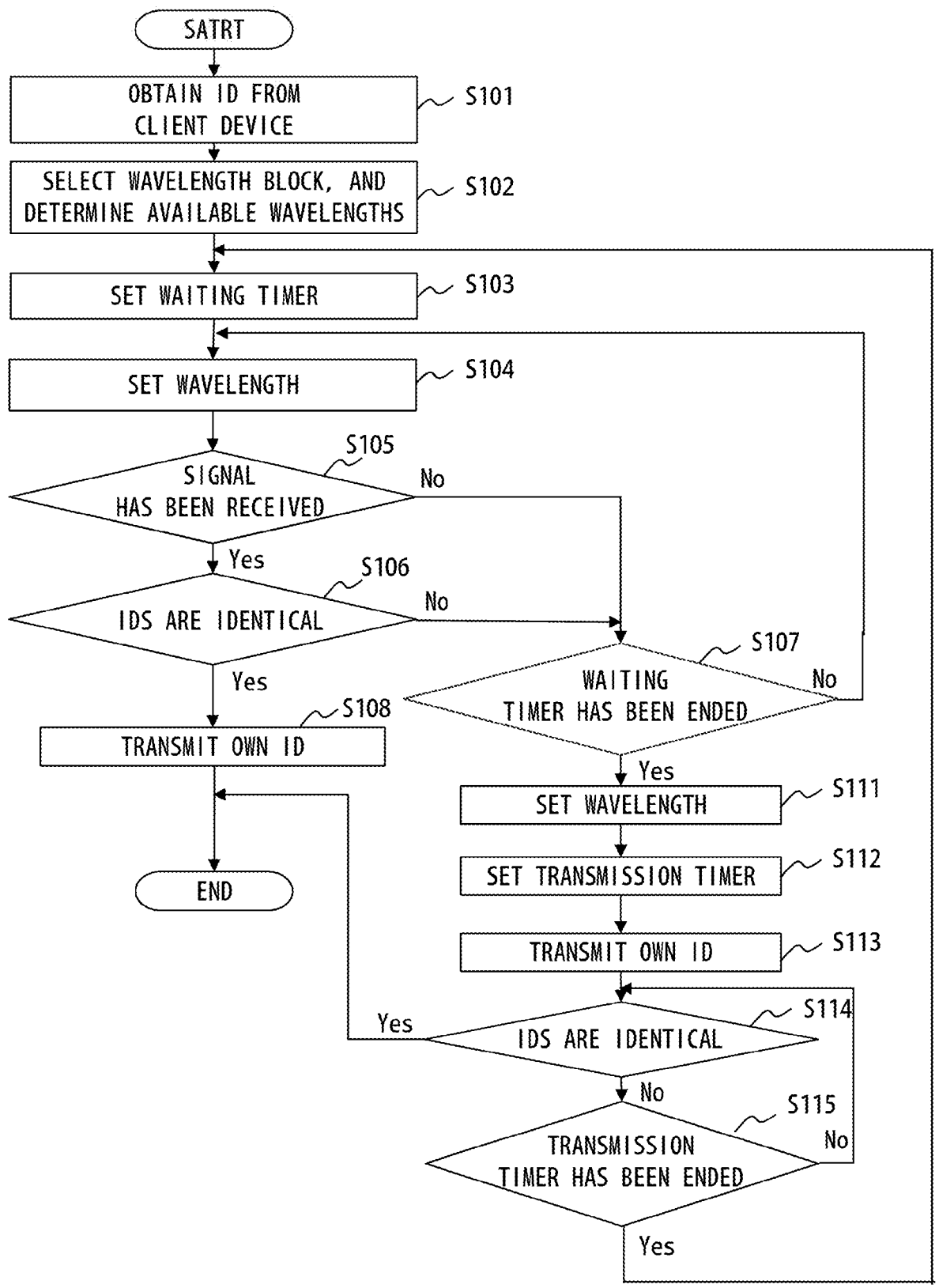
FIG. 23 is a flowchart indicating an example of a process of an optical transceiver.

FIG. 23 is a flowchart indicating an example of a process of an optical transceiver. The process of this flowchart is performed when a client device is connected to the optical transceiver. The flowchart indicates a process of selecting a wavelength channel.

In S101, the ID information obtaining unit 212 obtains ID information from a corresponding client device. In this example, the ID information obtaining unit 212 obtains, as the ID information, the value of a network section of an IP address of the source of an OSPF Hello packet transmitted from the client device. The ID information obtaining unit 212 saves the ID information. ID information obtained from a corresponding client device may hereinafter be referred to as "own ID information".

In S102, the available wavelength determination unit 213 selects a wavelength block that corresponds to the ID information and specifies available wavelength channels belonging to the wavelength block. As a result, available wavelength channels that correspond to the ID information are specified. In S103, the waiting timer 216 is activated. In S104-S107, the optical transceiver performs the waiting process.

In S104, the wavelength selector 214 selects a wavelength channel to be used by the optical transceiver from the wavelength block selected by the available wavelength determination unit 213. In S105, the optical receiver 221 waits for an optical signal transmitted from a correspondent site via the wavelength channel selected by the wavelength selector 214. When the optical receiver 221 receives an optical signal via the selected wavelength channel, the ID information extraction unit 222 extracts ID information from the optical signal. In S106, the comparator 223 compares own ID information with the ID information received from the correspondent site.

When the optical receiver 221 receives no optical signals, or when own ID information does not match the ID information received from the correspondent site, the process of the optical transceiver returns to S104. In S104, the wavelength selector 214 selects a next wavelength channel from the wavelength block selected by the available wavelength determination unit 213. Accordingly, the optical transceiver sequentially selects wavelength channels belonging to the selected wavelength block one by one until ID information that matches the own ID information is received from the correspondent site.

When ID information received from the correspondent site matches the own ID information, the process of the optical transceiver shifts to S108. In S108, the ID information inserter 217 inserts the ID information saved by the ID information obtaining unit 212 (i.e., own ID information) into a packet to be transmitted to the correspondent site. Then, the optical transmitter 218 transmits this packet to the correspondent site. In this case, the optical transmitter 218 transmits an optical signal using the wavelength channel selected by the wavelength selector 214 in S104.

When the waiting timer 216 expires in S107 before ID information that matches the own ID information is received from the correspondent site, the process of the optical transceiver shifts to S111. That is, the waiting process is ended.

In S111, the wavelength selector 214 selects a wavelength channel to be used by the optical transceiver from the wavelength block selected by the available wavelength determination unit 213. In S112, the transmission timer 215 is activated. Then, the optical transceiver performs a transmission/reception process of S113-S115.

In S113, the ID information inserter 217 inserts ID information saved by the ID information obtaining unit 212 (i.e., own ID information) into a packet to be transmitted to the correspondent site. Then, the optical transmitter 218 transmits this packet to the correspondent site. In this case, the optical transmitter 218 transmits an optical signal using the wavelength channel selected by the wavelength selector 214 in S111. In addition, the optical receiver 221 waits for an optical signal transmitted from the correspondent site using the wavelength channel selected by the wavelength selector 214 in S111.

In the transmission/reception process of S113-S115, the optical transceiver waits for an optical signal transmitted from the correspondent site while repeatedly transmitting ID information to the correspondent site. When the optical receiver 221 receives an optical signal, the ID information extraction unit 222 extracts ID information from the optical signal. The comparator 223 compares own ID information with the ID information received from the correspondent site.

When the own ID information matches the ID information received from the correspondent site, the process of the optical transceiver is ended. When the transmission timer 215 expires in S115 before ID information that matches the own ID information is received from the correspondent site, the transmission/reception process is ended, and the process of the optical transceiver returns to S103. Accordingly, the waiting process of S104-S107 and the transmission/reception process of S113-S115 are alternatively performed until it is determined in S106 or S114 that the own ID information matches ID information received from the correspondent site.

As described above, when it is determined in S106 that own ID information matches the ID information received from the correspondent site, the optical transceiver starts to perform a bidirectional data communication with the correspondent site using the wavelength channel selected in S104. When it is determined in S114 that own ID information matches the ID information received from the correspondent site, the optical transceiver starts to perform a bidirectional data communication with the correspondent site using the wavelength channel selected in S111.

In the example depicted in FIG. 23, the waiting process is ended when the waiting timer 216 is expired. However, the second embodiment is not limited to this procedure. For example, the waiting process may be ended when scanning is completed for all available wavelength channels determined by the available wavelength determination unit 213. In this case, the optical transceiver does not need to include the waiting timer 216.

The following describes the flowchart depicted in FIG. 23 by referring to the example indicated in FIG. 22. In the following descriptions, the client device 201a is connected to the optical transceiver 202a in the site X. Accordingly, the optical transceiver 202a obtains own ID information (ID_a). The optical transceiver 202a performs the waiting process of S104-S107. In this waiting process, however, the optical transceiver 202a does not receive, from the site Y, ID information that is identical with the own ID information.

After selecting wavelength channel ch3 in S111, the optical transceiver 202a performs the transmission/reception process of S113-S115. In particular, the optical transceiver 202a transmits ID information ID_a to the site Y using wavelength channel ch3 and waits for an optical signal transmitted from the site Y via wavelength channel ch3. In this transmission/reception process, however, the optical transceiver 202a receives no optical signals via wavelength channel ch3.

When the transmission/reception period is ended, the optical transceiver 202a performs the waiting process of S104-S107 again. In this waiting process, however, the optical transceiver 202a also does not receive ID information that is identical with the own ID information.

In the site Y, when the client device 203a is connected to the optical transceiver 204a, the optical transceiver 204a obtains own ID information (ID_a) in S101 and selects a wavelength block in S102. Then, the optical transceiver 204a performs the waiting process of S104-S107. In this process, the optical transceiver 204a waits for ID information transmitted from the site X while sequentially selecting wavelength channels within the selected wavelength block one by one.

When the waiting period is ended, the optical transceiver 202a performs the transmission/reception process of S113-S115 again. In this process, the optical transceiver 202a selects wavelength channel ch1 in S111. In particular, the optical transceiver 202a transmits ID information ID_a to the site Y using wavelength channel ch1 and waits for an optical signal transmitted via wavelength channel ch1 from the site Y.

In the waiting process, the optical transceiver 204a receives the ID information ID_a transmitted from the site X via wavelength channel ch1. In S106, accordingly, the optical transceiver 204a compares the own ID information with the ID information received from the site X. The own ID information matches the ID information received from the site X. In the optical transceiver 204a, in this case, the optical transmitter 218 is configured to transmit an optical signal to the site X using wavelength channel ch1, and the optical receiver 221 is configured to receive an optical signal from the site X via wavelength channel ch1. In S108, the optical transceiver 204a transmits the own ID information to the site X using wavelength channel ch1.

ID information is transmitted from the optical transceiver 204a while the optical transceiver 202a is performing the transmission/reception process of S113-S115. In this process, the optical transceiver 202a waits for an optical signal transmitted from the site Y via wavelength channel ch1. Hence, the optical transceiver 202a receives an optical signal transmitted from the site Y via wavelength channel ch1 and extracts ID information ID_a from the received optical signal. In S114, the optical transceiver 202a compares the own ID information with the ID information received from the site Y. The own ID information matches the ID information received from the site Y. In the optical transceiver 202a, in this case, the optical transmitter 218 is configured to transmit an optical signal to the site Y using wavelength channel ch1, and the optical receiver 221 is configured to receive an optical signal from the site X via wavelength channel ch1.

In the wavelength selection sequence in accordance with the second embodiment, as described above, a wavelength channel for a data communication is used to transmit control information for wavelength selection. Hence, a dedicated wavelength channel for transmitting control information does not need to be provided, thereby enhancing the efficiency of wavelength usage for WDM transmissions.

Variation of Available Wavelength Determination Unit

When ID information is a numerical value, a remainder can be easily calculated by performing a division based on the configuration depicted in FIG. 21A. However, when ID information is a combination of a plurality of values or a character string, the configuration depicted in FIG. 21A is not necessarily appropriate.

FIG. 24 illustrates a variation of the available wavelength determination unit 213. In this example, the available wavelength determination unit 213 includes a hash value calculator 213d, a hash value converter 213e, and a block_wavelength converter 213c. The hash value calculator 213d calculates a hash value from ID information obtained by the ID information obtaining unit 212. The hash value converter 213e converts a hash value obtained by the hash value calculator 213d into a wavelength block number. As in the example depicted in FIGS. 21A-21C, the block_wavelength converter 213c determines available wavelength channels that correspond to a specified wavelength block. When a hash value obtained by the hash value calculator 213d uniquely identifies a wavelength block, the available wavelength determination unit 213 does not need to include the hash value converter 213e.

FIGS. 25A-25C illustrate another variation of the available wavelength determination unit 213. The available wavelength determination unit 213 depicted in FIG. 25A is used when, for example, ID information is known. As indicated in FIG. 25A, the available wavelength determination unit 213 includes an ID_block converter 213f and a block_wavelength converter 213c.

As depicted in FIG. 25B, the ID_block converter 213f includes a table indicating relations designated in advance between ID information and wavelength blocks. As in the example depicted in FIGS. 21A-21C, the ID_block converter 213f specifies a wavelength block that corresponds to supplied ID information. The block_wavelength converter 213c determines available wavelength channels that correspond to the specified wavelength block, as in the example indicated in FIGS. 21A-21C.

The available wavelength determination unit 213 may include a table indicating relations designated in advance between ID information and available wavelength channels, as depicted in FIG. 25C. In this case, the available wavelength determination unit 213 can directly determine a corresponding available wavelength channels when ID information is supplied.

Variation of Optical Transceiver

Figure 26:
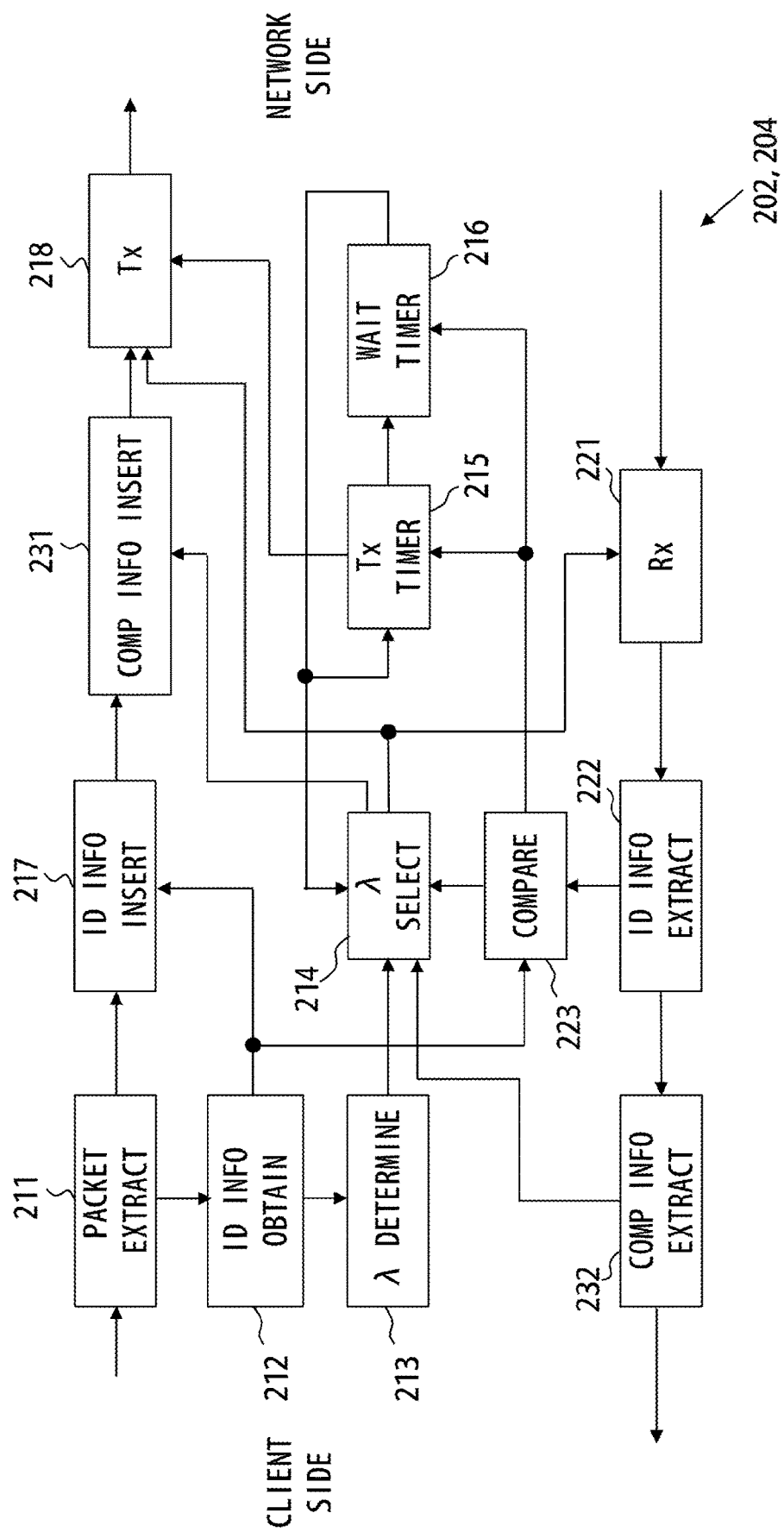
FIG. 26 illustrates an example of a variation of an optical transceiver.

FIG. 26 illustrates an example of a variation of the optical transceiver. In addition to the circuit depicted in FIG. 20, the optical transceiver illustrated in FIG. 26 includes an allocation completion information inserter 231 and an allocation completion information extractor 232.

When a wavelength allocation process performed by the optical transceiver is completed, the allocation completion information inserter 231 generates allocation completion information. Allocation completion information includes information indicating a wavelength channel selected for data communications (i.e., allocated wavelength channel). Allocation completion information is transmitted to a correspondent site using a method similar to that for ID information. For example, allocation completion information may be inserted into a packet to be transmitted to the correspondent site. Alternatively, allocation completion information may be multiplexed into a signal to be transmitted to the correspondent site. In these cases, allocation completion information is transmitted to the correspondent site using, for example, a wavelength channel selected by the wavelength selector 214.

The allocation completion information extractor 232 extracts allocation completion information from a signal transmitted from the correspondent site. During a waiting period, the optical transceiver waits for an optical signal transmitted from the correspondent site while sequentially selecting wavelength channels of WDM signals one by one. Hence, the optical transceiver can receive allocation completion information transmitted using any wavelength channel.

The received allocation completion information is guided to the wavelength selector 214. Then, the wavelength selector 214 excludes the allocated wavelength channel designated by the allocation completion information from available wavelength channels determined by the available wavelength determination unit 213. The wavelength selector 214 selects a wavelength channel to be used by the optical transceiver from the available wavelength channels from which the allocated wavelength channel has been excluded (i.e., selects from remaining wavelength channels).

As described above, the optical transceiver depicted in FIG. 26 excludes, in selecting a wavelength channel to be used for a data communication, a wavelength channel used by other optical transceiver. Hence, the wavelength selector 214 selects a wavelength channel to be used from fewer candidates. Accordingly, fewer wavelength channels are waited for in S104-S107 depicted in FIG. 23. Owing to the wavelength selector 214, wavelength channels used by other optical transceivers are not selected, thereby enhancing the efficiency of the wavelength selection sequence.

Figure 27:
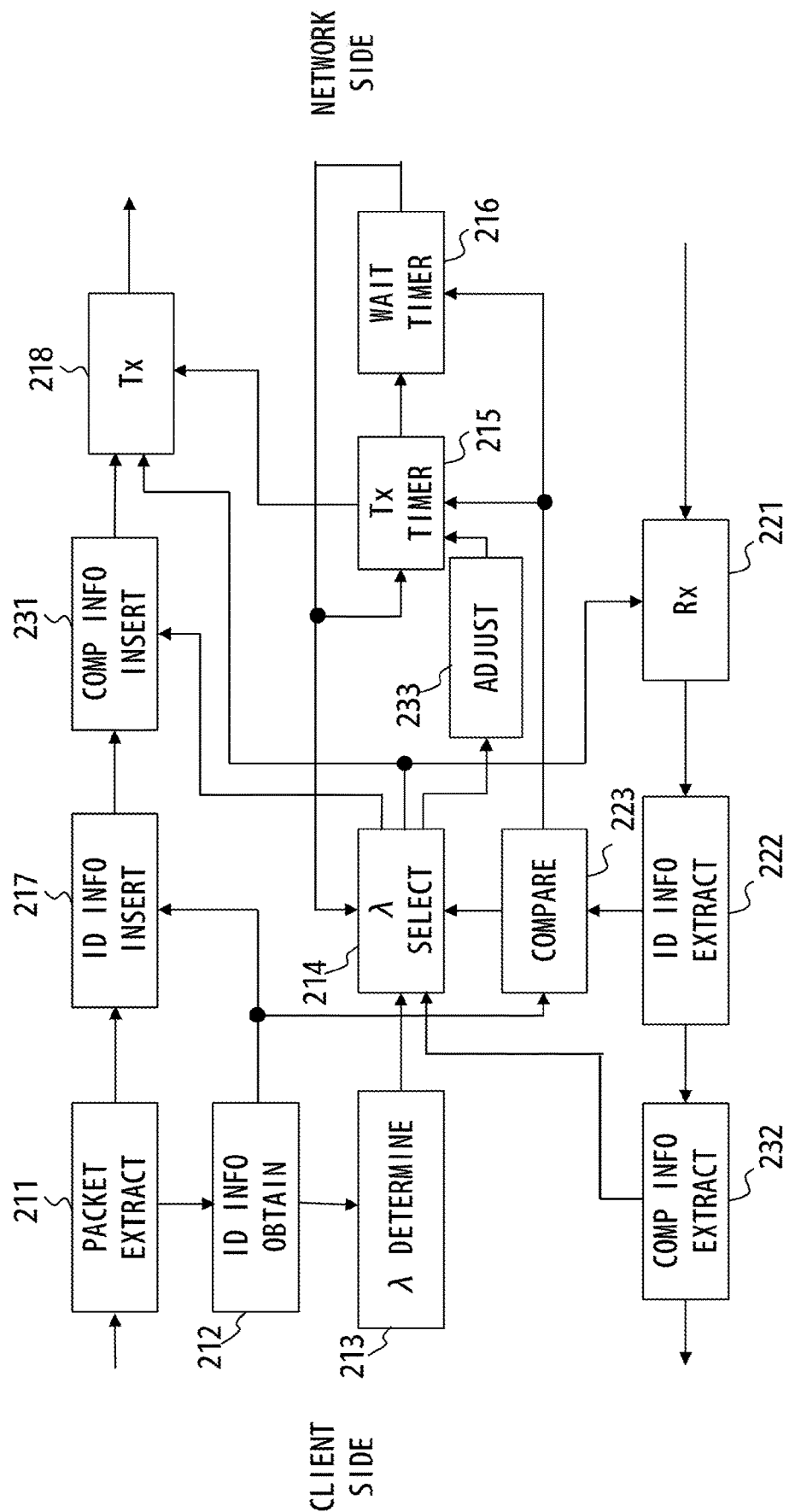
FIG. 27 illustrates another example of a variation of an optical transceiver.

FIG. 27 illustrates another example of the variation of the optical transceiver. The optical transceiver depicted in FIG. 27 includes a transmission timer adjuster 233 in addition to the circuit depicted in FIG. 26. In accordance with the number of wavelength channels that can be selected by the wavelength selector 214 (i.e., the number of remaining wavelength channels), the transmission timer adjuster 233 adjusts a transmission duration measured by the transmission timer 215.

In the configuration depicted in FIG. 26, the number of available wavelength channels is decreased when another optical transceiver selects a wavelength channel. Assume, for example, that wavelength channels ch1-ch10 belong to a wavelength block that corresponds to ID information and wavelength channel ch1 has been used by another optical transceiver. In this case, the wavelength selector 214 selects a wavelength channel to be used from wavelength channels ch2-ch10.

In the waiting process of S104-S107, the optical transceiver waits for an optical signal while sequentially selecting available wavelength channels one by one. In order to ensure that an optical transceiver in the correspondent site receives an optical signal transmitted using an arbitrary channel in the transmission/reception process of S113-S115, optical signals need to be transmitted repeatedly throughout the period of the waiting process. In other words, in a case where optical signals are transmitted repeatedly for a period of time that is needed for a process of sequentially selecting available wavelength channels one by one in the waiting process, a target optical signal is considered to be reliably received by the optical transceiver in the correspondent site. Note that the transmission timer 215 counts a period in which the optical transceiver repeatedly transmits optical signals in the transmission/reception process.

In accordance with the number of wavelength channels that can be selected by the wavelength selector 214, the transmission timer adjuster 233 adjusts a transmission duration counted by the transmission timer 215. Assume, for example, that the number of available wavelength channels is 10 and that in the waiting process, for one wavelength channel, an optical signal is waited for a duration T. In this case, a duration needed for the waiting process is 10T. When the number of available wavelength channels is decreased from 10 to 9, the duration needed for the waiting process is also decreased from 10T to 9T. In this case, the transmission timer adjuster 233 updates the transmission duration counted by the transmission timer 215 from 10T to 9T. As a result, the processing time needed for the wavelength selection sequence is shortened.

FIG. 28 illustrates still another example of the variation of the optical transceiver. The optical transceiver depicted in FIG. 28 includes a wavelength block reset unit 234 in addition to the circuit depicted in FIG. 26. The wavelength block reset unit 234 resets a relation between ID information and a wavelength block.

In the examples depicted above, a wavelength block that corresponds to ID information is allocated to an optical transceiver that has made a request for a data communication. In this case, in the above-described method of determining a wavelength block by using a remainder or a hash value, a plurality of optical transceivers could be allocated intensively to a particular wavelength block. Meanwhile, some wavelength channels may be incapable of being used due to a transmission path condition. In these cases, when a certain wavelength block is allocated to an optical transceiver newly requesting a wavelength channel, no selectable wavelength channels may remain in the wavelength block.

In the configuration depicted in FIG. 28, when all wavelength channels belonging to a certain wavelength block have been allocated to other optical transceivers, the wavelength selector 214 generates a zero report indicating that no selectable wavelength channels remain in the wavelength block. Upon receipt of the zero report, the wavelength block reset unit 234 resets the relation between the ID information and the wavelength block.

Assume in an initial setting in the example depicted in FIGS. 21A-21C, wavelength block #1 has been allocated to ID information that provides a remainder of zero when being divided by "4" (hereinafter referred to as interested ID information). Further assume that all wavelength channels belonging to wavelength block #1 have been allocated to other optical transceivers. In this case, the wavelength selector 214 generates a zero report designating wavelength block #1. Thus, the wavelength block reset unit 234 allocates a wavelength block different from wavelength block #1 to the interested ID information in accordance with a specified rule. In one example, a currently allocated wavelength block is replaced with another wavelength block having a wavelength block number that has higher by one than that of the currently allocated wavelength block. In the above-described case, wavelength block #2 is allocated to the interested ID information. In this example, it is assumed that all optical transceivers recognize the rule for resetting a wavelength block.

As described above, when the number of remaining wavelength channels in a selected wavelength block is zero, the wavelength block reset unit 234 resets the relation between ID information and the wavelength block. Thus, the available wavelength determination unit 213 selects another wavelength block. Accordingly, new wavelength channel candidates are provided. Then, the wavelength selector 214 selects a wavelength channel for the data communication from the new wavelength channel candidates.

In the communication systems depicted in FIGS. 18-28, one client device is connected to each optical transceiver. However, the second embodiment is not limited to this configuration. For example, one client device may be connected to a plurality of optical transceivers, as depicted in FIG. 29.

In the example depicted in FIG. 29, a data communication is performed between an L3 client device (router 241) provided in site X and an L3 client device (router 244) provided in site Y. The router 241 performs a data communication with the router 244 via a plurality of optical transceivers 202 (202a-202k). The router 244 performs a data communication with the router 241 via a plurality of optical transceivers 204 (204a-204k). In particular, the routers 241 and 244 establish a plurality of links through link aggregation (IEEE802.3.ad). An L2 device is provided between the router 241 and the optical transceivers 202a-202k. An L2 device is also provided between the router 244 and the optical transceivers 204a-204k.

In a communication system with the configuration described above, the optical transceivers 202 and 204 each obtain ID information when a plurality of links (i.e., a plurality of wavelength channels) are established between the optical transceivers 202a-202k and the optical transceivers 204a-204k. By obtaining ID information of layer 2 (e.g., identifier of Link Layer Discovery Protocol) from the L2 device, the optical transceivers 202 and 204 can identify the wavelength channels. However, when link aggregation is performed between the L2 devices, an address of the L3 device may be needed depending on a capability of the L2 devices.

However, when the address of the L3 device is used as ID information, the optical transceivers 202a-202k obtain the same ID information (a subnet value of the router 241), and the optical transceivers 204a-204k obtain the same ID information (a subnet value of the router 244). Hence, a wavelength channel is established between an arbitrary optical transceiver 202 in the site X and an arbitrary optical transceiver 204 in the site Y when a plurality of wavelength channels are established between the optical transceivers 202a-202k and the optical transceivers 204a-204k. For example, a wavelength channel may be established between the optical transceivers 202a and 204a or may be established between the optical transceivers 202a and 204k.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission device that is provided at a first site in an optical transmission system that transmits a wavelength division multiplexed optical signal between the first site and a second site, the optical transmission device comprising:
   an optical transmitter configured to transmit a first optical signal that includes first ID information to the second site using a first wavelength; and
   an optical receiver configured to receive a second optical signal that includes second ID information and that is transmitted using the first wavelength from the second site, wherein
   the optical receiver detects one or more unused wavelengths that have not been used in the optical transmission system,
   the optical receiver obtains information that indicates one or more unused wavelengths detected in the second site,
   when the first ID information matches the second ID information extracted from the second optical signal, the optical transmission device selects a second wavelength from among common wavelengths included in both of the one or more unused wavelengths detected by the optical receiver and the one or more unused wavelengths detected in the second site, and the optical transmitter transmits a wavelength report that indicates the second wavelength to the second site using the first wavelength, and
   when the optical receiver receives a completion report that indicates the wavelength report has been received at the second site, the completion report being transmitted using the first wavelength, the optical transmitter transmits an optical signal to the second site using the second wavelength, and the optical receiver ceases to receive an optical signal of the first wavelength from the second site.

2. The optical transmission device according to claim 1, further comprising:
   an obtaining unit configured to obtain the first ID information from an input signal; and
   a controller configured to control a communication between the optical transmission device and a correspondent optical transmission device provided at the second site, wherein
   the controller
   determines which of the optical transmission device or the correspondent optical transmission device is to be operated as a master device when the first ID information matches the second ID information,
   detects wavelengths that have been unused in the optical transmission system, and
   determines the second wavelength according to the unused wavelengths detected by the controller and unused wavelengths detected by the correspondent optical transmission device when the optical transmission device is operated as a master device.

3. The optical transmission device according to claim 2, wherein
   the obtaining unit obtains information for identifying a source of the input signal or a portion of the information as the first ID information.

4. The optical transmission device according to claim 3, wherein
   the input signal is a packet for neighbor discover or neighbor check that is transmitted from a router, and
   the obtaining unit obtains, as the first ID information, a value of a network address section of an address for identifying the router from the packet.

5. The optical transmission device according to claim 2, wherein
   the controller transmits a wavelength report indicating the second wavelength to the correspondent optical transmission device.

6. The optical transmission device according to claim 2, wherein
   the optical transmitter includes a wavelength tunable light source,
   the optical receiver includes a wavelength tunable local light source, and
   the controller controls the wavelength tunable light source such that the optical transmitter transmits an optical signal of the second wavelength and controls the wavelength tunable local light source such that the optical receiver coherently receives an optical signal of the second wavelength.

7. The optical transmission device according to claim 2, wherein the optical transmitter includes a wavelength tunable light source, the optical receiver includes a variable band pass filter, and the controller controls the wavelength tunable light source such that the optical transmitter transmits an optical signal of the second wavelength and controls the variable band pass filter such that the optical receiver receives an optical signal of the second wavelength.

8. An optical transmission method used by an optical transmission device that is provided at a first site in an optical transmission system that transmits a wavelength division multiplexed optical signal between the first site and a second site, the optical transmission method comprising:

transmitting a first optical signal that includes first ID information to the second site using a first wavelength;

receiving a second optical signal that includes second ID information and that is transmitted using the first wavelength from the second site;

detecting one or more unused wavelengths that have not been used in the optical transmission system; and obtaining information that indicates one or more unused wavelengths detected in the second site, wherein when the first ID information matches the second ID information extracted from the second optical signal, a second wavelength is selected from among common wavelengths included in both of the one or more unused wavelengths detected in the optical transmission device and the one or more unused wavelengths detected in the second site, and a wavelength report that indicates the second wavelength is transmitted to the second site using the first wavelength, and when a completion report that indicates that the wavelength report has been received at the second site is received, the completion report being transmitted using the first wavelength, an optical signal is transmitted to the second site using the second wavelength, and a reception of an optical signal of the first wavelength from the second site is ceased.

9. An optical transmission system that transmits a wavelength division multiplexed optical signal between a first site at which a plurality of optical transmission devices are provided and a second site at which a plurality of optical transmission devices are provided, wherein a first optical transmission device of the plurality of optical transmission devices provided at the first site transmits a first optical signal that includes first ID information to the second site using a first wavelength, a second optical transmission device of the plurality of optical transmission devices provided at the second site transmits a second optical signal that includes second ID information to the first site using the first wavelength, the first optical transmission device detects one or more unused wavelengths that have not been used in the optical transmission system and transmits information that indicates the detected one or more unused wavelengths to the second optical transmission device, the second optical transmission device detects one or more unused wavelengths that have not been used in the optical transmission system and transmits information that indicates the detected one or more unused wavelengths to the first optical transmission device, when the first ID information matches the second ID information, the first optical transmission device selects a second wavelength from among common wavelengths included in both of the one or more unused wavelengths detected by the first optical transmission device and the one or more unused wavelengths detected by the second optical transmission device, and the first optical transmission device transmits a wavelength report that indicates the second wavelength to the second site using the first wavelength, when the second optical transmission device receives the wavelength report from the first site, the second optical transmission device transmits a completion report to the first site using the first wavelength, the completion report indicating that the wavelength report has been received, and when the first optical transmission device receives the completion report from the second site, the first optical transmission device transmits an optical signal to the second site using the second wavelength and ceases to receive an optical signal of the first wavelength transmitted from the second site.

10. An optical transmission system that transmits a wavelength division multiplexed optical signal between a first site at which a plurality of optical transmission devices are provided and a second site at which a plurality of optical transmission devices are provided, wherein each of the optical transmission devices obtains ID information from an input signal, when ID information obtained by a first optical transmission device provided at the first site from an input signal matches ID information obtained by a second optical transmission device provided at the second site from an input signal, the first and second optical transmission devices determine which of the first and second optical transmission devices is to be operated as a master device, the first and second optical transmission devices respectively detect wavelengths that have been unused in the optical transmission system, when the first optical transmission device is operated as a master device, the first optical transmission device selects, for a communication between the first and second optical transmission devices, a first wavelength from the wavelengths that have been unused in the optical transmission system, and when the first wavelength has not been selected for a communication between other optical transmission devices, the first optical transmission device allocates the first wavelength to the communication between the first and second optical transmission devices.

11. The optical transmission system according to claim 10, wherein when the first wavelength has been selected by a third optical transmission device for a communication between the third optical transmission device and a fourth optical transmission device, the first and third optical transmission devices determine which of the first and third optical transmission devices is to be operated as a master device, and when the first optical transmission device is operated as a master device with respect to the third optical transmission device, the first optical transmission device allocates the first wavelength to the communication between the first and second optical transmission devices, and the third optical transmission device selects a second wavelength different from the first wavelength for the communication between the third and fourth optical transmission devices.

12. The optical transmission system according to claim 10, further comprising:

a first optical coupler configured to generate a wavelength division multiplexed optical signal by combining a plurality of optical signals output from the plurality of optical transmission devices provided at the first site;

a first optical splitter configured to split and guide the wavelength division multiplexed optical signal generated by the first optical coupler to the plurality of optical transmission devices provided at the second site;

a second optical coupler configured to generate a wavelength division multiplexed optical signal by combining a plurality of optical signals output from the plurality of optical transmission devices provided at the second site; and a second optical splitter configured to split and guide the wavelength division multiplexed optical signal generated by the second optical coupler to the plurality of optical transmission devices provided at the first site.

13. The optical transmission system according to claim 10, further comprising:

a first arrayed waveguide (AWG) configured to generate a wavelength division multiplexed optical signal by combining a plurality of optical signals output from the plurality of optical transmission devices provided at the first site;

an optical splitter configured to split and guide the wavelength division multiplexed optical signal generated by the first AWG to the plurality of optical transmission devices provided at the second site;

an optical coupler configured to generate a wavelength division multiplexed optical signal by combining a plurality of optical signals output from the plurality of optical transmission devices provided at the second site; and a second AWG configured to divide the wavelength division multiplexed optical signal generated by the optical coupler with respect to wavelengths so as to generate a plurality of optical signals and guide the plurality of optical signals to corresponding optical transmission devices provided at the first site.

14. An optical transmission system that transmits a wavelength division multiplexed optical signal between a first site at which a plurality of optical transmission devices are provided and a second site at which a plurality of optical transmission devices are provided, the optical transmission system comprising:

a first controller configured to control the plurality of optical transmission devices provided at the first site; and a second controller configured to control the plurality of optical transmission devices provided at the second site, wherein each of the optical transmission devices obtains ID information from an input signal, when ID information obtained by a first optical transmission device provided at the first site from an input signal matches ID information obtained by a second optical transmission device provided at the second site from an input signal, the first and second controllers determine which of the first and second controllers is to be operated as a master device, the first and second optical transmission devices respectively detect wavelengths that have been unused in the optical transmission system, when the first controller is operated as a master device, the first controller selects, for a communication between the first and second optical transmission devices, a first wavelength from the wavelengths that have been unused in the optical transmission system, and when the first wavelength has not been selected for a communication between other optical transmission devices, the first controller allocates the first wavelength to the communication between the first and second optical transmission devices.

15. An optical transmission device that is provided at a first site in an optical transmission system that transmits a wavelength division multiplexed optical signal between the first site and a second site, the optical transmission device comprising:

an optical transmitter configured to transmit an optical signal to the second site;

an optical receiver configured to receive an optical signal from the second site;

an available wavelength determination unit configured to determine available wavelengths according to first ID information; and a wavelength selector configured to select a first wavelength from the available wavelengths, wherein the optical transmitter transmits a first optical signal that includes the first ID information to the second site using the first wavelength, the optical receiver receives a second optical signal of the first wavelength transmitted from the second site, when the optical receiver receives, from the second site, information indicating an allocated wavelength that is a wavelength that has been allocated to a communication between the first site and the second site, the wavelength selector selects the first wavelength from remaining wavelengths that are wavelengths remaining after excluding the allocated wavelength from the available wavelengths determined by the available wavelength determination unit, the optical transmission device further includes an adjuster configured to adjust a length of a transmission period in accordance with a number of the remaining wavelengths, the optical transmitter repeatedly transmits the first optical signal to the second site during the transmission period with the length thereof adjusted by the adjuster, and when the first ID information matches second ID information extracted from the second optical signal, the optical transmitter transmits an optical signal to the second site using the first wavelength, and the optical receiver receives an optical signal of the first wavelength transmitted from the second site.

16. An optical transmission device that is provided at a first site in an optical transmission system that transmits a wavelength division multiplexed optical signal between the first site and a second site, the optical transmission device comprising:

an optical transmitter configured to transmit an optical signal to the second site;

an optical receiver configured to receive an optical signal from the second site;

an available wavelength determination unit configured to determine available wavelengths according to first ID information; and a wavelength selector configured to select a first wavelength from the available wavelengths, wherein the optical transmitter transmits a first optical signal that includes the first ID information to the second site using the first wavelength, the optical receiver receives a second optical signal of the first wavelength transmitted from the second site, when the optical receiver receives, from the second site, information indicating an allocated wavelength that is a wavelength that has been allocated to a communication between the first site and the second site, the wavelength selector selects the first wavelength from remaining wavelengths that are wavelengths remaining after excluding the allocated wavelength from the available wavelengths determined by the available wavelength determination unit, when a number of the remaining wavelength is zero, the available wavelength determination unit determines wavelength candidates different from the available wavelengths determined according to the first ID information, and the wavelength selector selects the first wavelength from the wavelength candidates, and when the first ID information matches second ID information extracted from the second optical signal, the optical transmitter transmits an optical signal to the second site using the first wavelength, and the optical receiver receives an optical signal of the first wavelength transmitted from the second site.

17. An optical transmission method for transmitting a wavelength division multiplexed optical signal between a first site at which a plurality of optical transmission devices are provided and a second site at which a plurality of optical transmission devices are provided, wherein
- a first optical transmission device of the plurality of optical transmission devices provided at the first site obtains first ID information from a signal input to the first optical transmission device,
- a second optical transmission device of the plurality of optical transmission devices provided at the second site obtains second ID information from a signal input to the second optical transmission device, the second optical transmission device sequentially selects wavelengths available to the second optical transmission device one by one, and waits for an optical signal transmitted from the first site respectively for the selected wavelengths, the first optical transmission device transmits a first optical signal that includes the first ID information to the second site using a first wavelength selected from the wavelengths available to the first optical transmission device, when the second optical transmission device receives the first optical signal, the second optical transmission device extracts the first ID information from the first optical signal, when the second optical transmission device decides that the first ID information matches the second ID information, the second optical transmission device configures an optical transmitter and an optical receiver of the second optical transmission device such that a data communication with the first site is performed using the first wavelength, and transmits a second optical signal that includes the second ID information to the first site using the first wavelength, the first optical transmission device extracts the second ID information from the second optical signal, and when the first optical transmission device decides that the first ID information matches the second ID information, the first optical transmission device configures an optical transmitter and an optical receiver of the first optical transmission device such that a data communication with the second site is performed using the first wavelength.

* * * * *